(12) United States Patent　(10) Patent No.: US 6,898,266 B2
Griffith　(45) Date of Patent: May 24, 2005

(54) 3D PROJECTION METHOD

(75) Inventor: Lionell K. Griffith, Solvang, CA (US)

(73) Assignee: Digitome Corporation, Davidson, NC (US)

( * ) Notice: Subject to any disclaimer, the term of this patent is extended or adjusted under 35 U.S.C. 154(b) by 0 days.

(21) Appl. No.: 10/698,779

(22) Filed: Oct. 30, 2003

(65) Prior Publication Data

US 2004/0091084 A1 May 13, 2004

Related U.S. Application Data

(63) Continuation of application No. 10/687,180, filed on Oct. 15, 2003, which is a continuation of application No. 09/709,586, filed on Nov. 13, 2000, now Pat. No. 6,671,349.
(60) Provisional application No. 60/422,532, filed on Oct. 31, 2002.

(51) Int. Cl.$^7$ ............................................. G01N 23/083
(52) U.S. Cl. ........................................... 378/22; 378/21
(58) Field of Search .............................. 378/21, 22, 901

(56) References Cited

U.S. PATENT DOCUMENTS

| | | |
|---|---|---|
| 5,051,904 A | 9/1991 | Griffith |
| 5,070,454 A | 12/1991 | Griffith |
| 5,319,550 A | 6/1994 | Griffith |
| 6,002,739 A * | 12/1999 | Heumann ................ 378/8 |
| 6,724,856 B2 * | 4/2004 | De Man et al. ............ 378/62 |

* cited by examiner

*Primary Examiner*—David V Bruce
(74) *Attorney, Agent, or Firm*—Fulbright & Jaworski

(57) ABSTRACT

A digitized tomosynthesis method for projecting a 3D volumetric image of an object onto a virtual projection plane that comprises an alpha blend plane subdivided into a rectangular array of pixel cells. A ray of energy defines a trace representing a virtual sight path ray passing from a view point through one pixel cell of the alpha blend plane to define a view level image, wherein a 3D volumetric image of the object is projected by computing the coordinate of an object voxel referenced to the image plane, computing the image plane intercept of the ray of energy from the source through the object voxel, and forming a plurality of successively selected view level image planes at the alpha blend plane.

20 Claims, 7 Drawing Sheets

3D PROJECTION METHOD

CROSS REFERENCE TO RELATED APPLICATION

This application claims the benefit of Provisional Patent Application No. 60/422,532, filed Oct. 31, 2002, and is a continuation-in part of U.S. patent application Ser. No. 09/709,586 filed on Nov. 13, 2000 now U.S. Pat. No. 6,671,349, as well as being a continuation-in-part of U.S. patent application Ser. No. 10/687,180 filed on Oct. 15, 2003, which in turn is a continuation-in part of U.S. patent application Ser. No. 09/709,586 filed on Nov. 13, 2000.

FIELD OF THE INVENTION

The fields of art to which the invention pertains include the fields of dynamic tomography and computed tomography.

BACKGROUND OF THE INVENTION

A unique x-ray imaging and inspection system that combines 3D volumetric imaging and conventional 2D radiography for a complete x-ray inspection solution has been provided under the mark Digitome. For purposes of this application, the system will be referred to a "digitized tomography". Digitized tomography technology has been used for film based 3-dimensional x-ray imaging, and has been enhanced to incorporate digital flat panel x-ray detectors, resulting in examinations being made in minutes. Its features, provide unique capabilities to view any horizontal or vertical plane, scan through the volume in 0.005" increments and measure internal features. See Griffith U.S. Pat. No. 5,051,904 ("Computerized Dynamic Tomography System"), U.S. Pat. No. 5,070,454 ("Reference Marker Orientation System For A Radiographic Film-Based Computerized Tomography System"), and U.S. Pat. No. 5,319,550 ("High Resolution Digital Image Registration"), the disclosures of which are incorporated herein by reference.

The digitized tomography software contains what is known as the digitized tomography kernel. It is a set of software modules that are used to compute digitized tomography views. One defines the geometry by which the images are formed, the data arrays that contain the image data, and the coordinates of an object space. The resultant voxel value is returned to the calling software. It is the calling software's responsibility to resend the coordinates and store the voxel values so they produce the desired digitized tomography view foil.

From its inception, the digitized tomography kernel was based upon a digital simulation of what is known as the film mode. Referring to FIG. 1, its geometric derivation assumes the source 10 is at a canted angle with respect to the image plane 12. The object to examine is positioned centrally over the intersect 14 of the x-ray source optical axis 16 and the image plane. The object is then is stepwise rotated about an axis perpendicular to the image plane 12 and that passes through the above intersect. An x-ray image is acquired at each rotation position of the object.

In the film simulation mode, each acquired image is rotated by the same angle as was the object when it was exposed. The resulting images are stacked with their axes of rotation coincident. Finally, each image is translated radially inward from its axis of rotation by a distance related to the object level one desires to observe. The translation distance is a function of the perpendicular distance between the image plane and the view plane. Light passing through a stack of film positioned thusly will reveal the features at the desired view plane.

A similar computed combination of the data from a series of digitally acquired images will result in the same view obtained in the previously referred to film simulation mode and requires the combination of registered pixels from each of the digitized images. The method is described in Appendix A. In addition, other view foils are possible to compute simply by changing the pattern of the voxel coordinates passed to the digitized tomography kernel as well as various image enhancements. The film mode simulation digitized tomography kernel math is described in Appendix B wherein the kernel is limited to having the axis of rotation of the object perpendicular to the image plane.

Referring to FIG. 2, an alternate geometry can be useful. For example, the x-ray optical axis 16 could be perpendicular to the image plane and the axis of rotation of the object could be at another angle with respect to the image plane 12. This can allow the instrumentation to fit into a much smaller column because the source is immediately above the image plate rather than offset to the side. It can also permit larger and taller objects to be examined using a given image plate than does the current geometry. In a film mode simulation geometry, the object plane is not parallel to the film plane and the geometric magnification varies over the film plane. Methods can be provided by which a marker disk and misalignment post are placed to calibrate the alternate geometry.

BRIEF SUMMARY OF THE INVENTION

The present invention is directed to a 3D projection method for a digitized tomography image stack that includes the geometry of FIG. 1, the alternate geometry of FIG. 2, and potentially many other geometries, and uses what can be referred to as the digitized tomography kernel. The present invention uses the digitized tomography image stack to generate a 3D projection, using methods described more specifically in the Detailed Description below and in appendices A, B, C and D.

More particularly, a digitized tomosynthesis method is provided for projecting a 3D volumetric image of an object onto a virtual projection plane. The image is defined by object voxels, in which a ray of energy from a source, preferably electromagnetic radiation such as x-ray radiation, travels through the object to impinge on an energy sensing image plate, such as a flat panel digital detector, having an active area defining an image plane and in which an image is acquired by the energy sensor at successive relative rotational positions of the object and source. The image plate is parallel with a defined XZ plane and the source is positioned above the XZ plane with its optical axis defining the center of a radiation cone and intersecting the image plate at approximately its central pixel. A 3D volumetric image of the object is projected by computing the coordinate of an object voxel referenced to the image plane, computing the image plane intercept of the ray of energy from the source through the object voxel, and projecting a reconstructed 3D volumetric image of the object onto the virtual projection plane.

In a specific embodiment, the coordinate of the object voxel referenced to the image plane is computed by (a) defining an object bounding box above the XZ plane that intercepts the radiation cone so that a shadow of the object falls on the active area of the image plate, the position and orientation of the bounding box having a reference point coordinate defined by X, Y, Z, pitch, yaw, and roll, (b)

specifying the coordinate of the voxel referenced to the object bounding box, (c) rotating the voxel coordinate by the pitch, yaw, and roll of the bounding box, and (d) translating the voxel coordinate to the reference point coordinate. The bounding box has a size and height whereby it includes the volume of interest of the object. The bounding box and the image plate can each be rectangular, the sides of the bounding box being parallel with the sides of the image plate.

The virtual projection plane can comprise an alpha blend plane subdivided into an array, e.g., a rectangular array, of pixel cells wherein the ray of energy defines a trace thereof representing a virtual sight path ray passing from a view point through one pixel cell of the alpha blend plane to define a view level image. There is a ray trace for each pixel cell of the alpha blend plane for each view level image. A projected planar view of a selected view level image plane is formed at the alpha blend plane by transferring the image pixel cell value at the intersect of the ray trace and the selected view level plane to the image pixel cell at the intersect of the ray trace and the alpha blend plane. A plurality of view level images are formed successively at one image plane, the view point and alpha blend plane being translated a level closer to said one image plane for each successive view level.

The 3D volumetric image can be stored in a computer memory as an array of pixels represented by a value in which the brightness of each pixel is proportional to the value. The steps of the method of this invention can be performed mathematically and programmed whereby the reconstructed 3D volumetric image is projected by execution of the program on a computer.

Features and advantages of the invention will be described hereinafter which form the subject of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
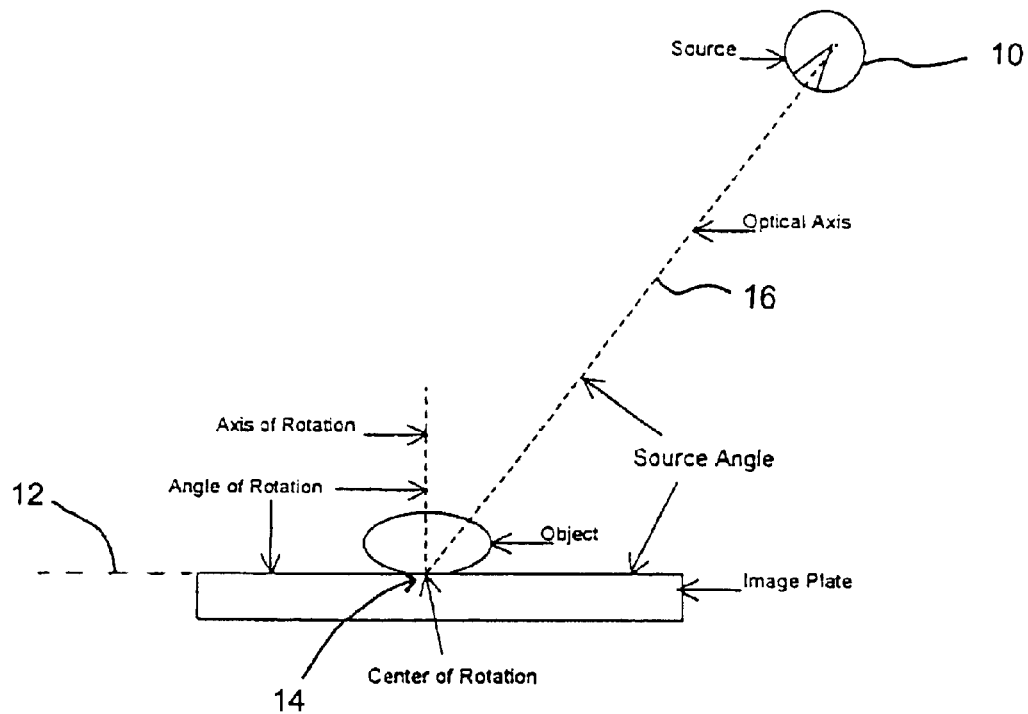
FIG. 1 is a schematic depiction of film mode operation of the digitized tomography kernel wherein the source is at a canted angle with respect to the image plane.
Figure 2:
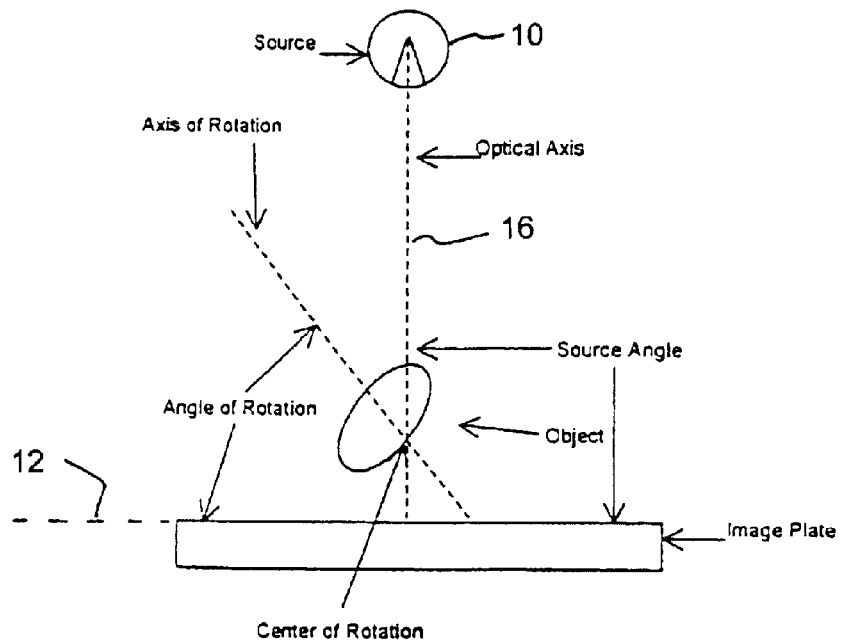
FIG. 2 is a schematic depiction of an alternate geometry for operation of the digitized tomography kernel wherein the x-ray optical axis is perpendicular to the image plane and the axis of rotation of the object is at another angle with respect to the image plane.
Figure 3:
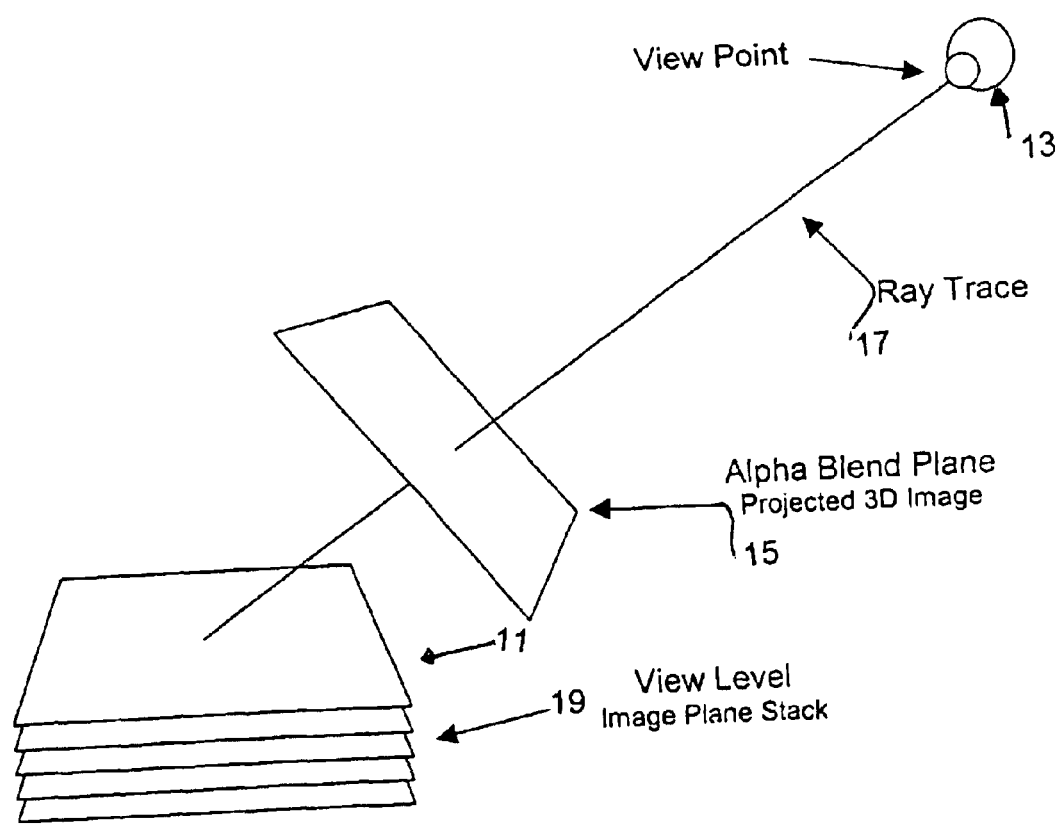
FIG. 3 is a schematic depiction of a method of the present invention for projecting a 3D image.

Referring to FIG. 3, the digitized tomography view level image plane stack 11 represents a sequence of digitized tomography planar views generated by methods disclosed in the appendices A, B, C and D. The images 19 on the stack 11 are generated separated by a fixed distance—usually by one pixel. The axis of generation can be any arbitrary axis. The most advantages axis is coincident with the examined object's axis of rotation otherwise known as the "Z" axis. For such a situation the planes can be generated as "XY" views. A view level image plane stack 11 can contain the least number of views to represent the object being projected. The "Z" and "XY" designations are due to historical decisions. The adaptation of modern graphical convention and ray tracing methods necessitated a change of axis labels where Z becomes Y, X becomes Z, and Y becomes X.

More specifically, the following defines a generalized method for the computation of the coordinate of the shadow of a specified digitized tomography object voxel:

The Coordinate System

The coordinate system follows the left hand rule using an aircraft yaw, pitch, roll metaphor to describe rotations. The eye is looking in the positive direction of the Z axis. The X axis is horizontal and positive to the right. The Y axis is vertical and positive up. All positive rotations will be counter clockwise when viewed along the negative axis direction. Pitch will be a rotation about the X axis. Yaw will be a rotation about the Y axis. Roll will be a rotation about the Z axis. Normal rotation transformations apply rotations in pitch, yaw, roll (X, Y, Z) order.

The Coordinate System Applied to Digitized Tomography

Three things are accurately located in space: the image plate, the object, and the source. The coordinates are to be specified in pixel units. One pixel unit is the distance between pixels on rows or columns of the image plate. The first pixel of the image plate is coincident with the coordinate axis origin and the plate is parallel with the XZ plane. The source is positioned above the XZ plane and its optical axis (center ray of radiation cone) intersects the image plate at approximately the image plate's central pixel. The radiation cone is presumed to be of approximately uniform intensity and emitted as if from a point source.

The object bounding box is positioned above the XZ plane and intercepts the radiation cone so that the shadow of the object falls on the active area of the image plate. The bounding box base is a square. The size of the base and the height of the bounding box is to be such that it includes the volume of interest of the object. Positions within the object are referenced to the center of the base of the bounding box. The standard position of the bounding box is with its base plane centered on origin of the image plate plane and parallel with the image plate plane. The sides of the bounding box are parallel with the sides of the image plate. The final position and orientation of the bounding box is expressed as the six degrees of freedom coordinates of the reference point: X, Y, Z, pitch, yaw, roll Computing the Image Coordinate of a Digitized Tomography Object Voxel Shadow 1. Compute the coordinate of the object voxel referenced to the image plane
   a. Specify the coordinate of the voxel referenced to the object bounding box
   b. Rotate the voxel coordinate by the specified pitch, yaw, and roll of the bounding box
   c. Translate the voxel coordinate to the reference point coordinate.
2. Compute the image plane intercept of the ray from the source through the object voxel 3D Projection Method The view point 13 represents the virtual position of the eye of the observer. The alpha blend plane 15 represents the virtual projection plane for the reconstructed projected 3D image. The alpha blend plane 15 is subdivided into a rectangular array of cells (i.e., pixels). The ray trace 17 represents a virtual sight path ray passing from the view point 13 through one pixel of the alpha blend plane 15 to one of the view level images. There will be a ray trace 17 for each cell of the alpha blend plane 15 for each view level image plane 19.

A projected planer view of any given view level image plane 19 can be formed at the alpha blend plane 15 by transferring the image cell value at the intersect of the ray trace 17 and the given view level plane 19 to the image cell at the intersect of the ray trace 17 and the alpha blend plane 15. A projected 3D image on the alpha blend plane 15 can be formed by alpha blending successive projected planer views, formed as above, starting from the bottom of the stack and starting with a black alpha blend image plane.

The above process can be accomplished mathematically and programmed for execution on a computer. However, a much more computationally efficient method is to form the images of the view levels successively at one image plane. Then translate the view point and the alpha blend plane one level closer to that plane for each successive view level.

In an implementation of the 3D projection method, an image is stored in computer memory as a rectangular array of pixels. A pixel is stored as an integer with a sufficient number of bits to represent the dynamic range of the image. The size of the pixel is determined by the image acquisition device. The pixels are stored in increasingly higher memory locations from left to right and bottom to top of the image. The bottom to top arrangement is a consequence of the way current operating systems handle image arrays and is not a property of digital images as such. The brightness (whiteness) of a pixel is proportional to the value stored in the pixel. White is represented as the maximum pixel value and black as zero. In the case of the current implementation, a pixel is stored as a sixteen bit word with a range of 0 to 4095 (12 bits) and has a size of 0.005 inches.

In the process of the present invention, the following steps are implemented:

1. Form a view level plane by method described in Appendix E. The origin of the plane corresponds with the first pixel of the image. Increasing X axis corresponds with image bottom to top. The Y axis is normal (perpendicular) to the plane. The increasing Z axis corresponds with image left to right. A pixel position corresponds to a integer Z, X coordinate
2. Compute reference coordinate
   Xr=image height/2
   Yr=0.0
   Zr=image width/2.
3. Compute the coordinate of the view point from operator provided data.
   Xvp=Xr
   Yvp=view distance/pixel size
   Zvp=Yr
   Rotate Xvp,Yvp,Zvp about the Z axes through Xr,Yr,Zr by (90 degrees—view angle) by method described in Appendix F.
4. Set the view level 19 to start level
5. Set all cells of an alpha blend plane 15 image data matrix to black.
6 For each view level until a view level greater than end level:
   Yvp=(view distance−(start level−view level))/pixel size
   For each pixel of the alpha blend plane
      Xpp=image line index
      Ypp=(projection plane distance−(start level−view level))/pixel size
      Zpp=image column index
   Rotate Xpp, Ypp, Zpp about the Z axes through Xr, Yr, Zr by (90 degrees—view angle) by the method described in Appendix F.
      Compute intersect of ray through Xvp,Yvp,Zvp and Xpp,Ypp,Zpp and the view level plane by method described in Appendix E.
      Extract the image cell value from the view level image at the intercept coordinates by method described in Appendix B.
      Save extracted image cell value in temporary projected image data matrix
      a the cell designated by the alpha blend plane image line index and image column index.
   Alpha blend the temporary projected image data matrix as source with the alpha blend plane image data matrix by the following method:
   Set view level to view level+view level increment.

Alpha Blendinq

Alpha blending is a standard graphics method for combining digital images or computer graphical elements such that there are varying degrees of transparency. The goal is to make background features visible through selected foreground features while still being able to see the foreground feature. The calculation:

destination pixel=(alpha*source pixel)+((1−alpha)*destination pixel)

is applied to each pixel position of a paired source and destination image or graphic. An alpha value of 1.0 produces the effect of the source pixel being opaque. An alpha value of 0.0 produces the effect of the source pixel being totally transparent. Alpha values between 1.0 and 0.0 will produce the effect of the source pixel being translucent inversely proportional to alpha.

In "true" color systems that implement alpha blending, it is typical to have 32 bit pixels that contain a red, blue, green, and alpha value for each pixel. The four values are each contained in a byte and can assume values from 0 to 255. For the three color values, 0 represents black, 255 represents the given color being of full brightness, and values in between represent less than full brightness proportional to its value. For the alpha value, 0 signifies the pixel is transparent and 255 signifies the pixel is opaque. Alpha values between 0 and 255 represent various levels of translucency inversely proportional to the alpha value.

Digitized tomography uses monochrome pixels. In the current system, a pixel is contained in sixteen bits (two bytes) and holds a twelve bit value from 0 to 4095. Where the 0 level represents a fully exposed pixel typically presented as black. The 4095 level represents a totally unexposed pixel typically presented as white. Since the image is the result of an X-ray exposure, the higher the pixel value the more dense (X-ray opaque) the object being exposed.

To blend X-ray images so the more dense features show through the less dense features, black pixels must be transparent and white pixels must be opaque. Grey must be treated increasingly translucent the blacker it becomes. To accomplish this effect, alpha is computed as a function of the source pixel value:

$$\text{alpha} = (\text{source pixel}/(\text{maximum pixel value}+1)).$$

In current systems the maximum pixel value is 4095. A configurable exponent is added to the equation to allow the user to adjust the proportionality of transparency to pixel value. The final calculation of alpha is:

$$\text{alpha} = (\text{source pixel}/(\text{maximum pixel value}+1))^{alpha\ exponent}$$

When the alpha exponent is 1.0, the relationship is linear. With values greater than 1.0, the effect is to make the intermediate pixel values more opaque toward the more grey. In any case, a 0 pixel value is transparent and a maximum pixel value is opaque.

The image data matrix resulting from the above process will be a projected 2D view of a 3D image regenerated from the digitized tomography view level image stack.

Features of the invention include:

1. Use of digitized tomography views to generate a 3D projection.
2. Use of ray tracing to produce a projected view of a digitized tomography view by using the intercept of a line and a plane, a line from the view point through the projection plane cell, and a plane representing a digitized tomography view level plane.
3. Use of digitized tomography between pixel calculation to extract value from projected view.
4. Use of alpha blending to combine projected views.
5. Using a function of pixel intensity to compute the alpha for alpha blending.
6. Use of an exponent to adjust the weighting of alpha in alpha blending method:
   a. increasing exponent increases opacity of ever lower pixel values;
   b. exponent of 1.0 same as no exponent;
   c. can be used to adjust visible portion of image in projected 3D image.
7. Increased computational efficiency by level shifting of view point and projection point rather than shifting level of view level plane:
   a. shifting plane is computationally significant;
   b. shifting projection point is combined with needed coordinate transformation;
   c. shifting view point is simple subtraction.

Conceptually, digitized tomography represents "analysis" in that it produces the visual equivalent of a succession of "slices" of the examined object. The 3D projection method added to digitized tomography represents "synthesis" in that it produces the visual equivalent of putting the "slices" back together. Therefore, the term digitized tomosynthesis is appropriate. Digitized tomosynthesis has as its primary value the ability to reduce visual complexity and highlight various subtle features. Similarly, the projection method as described can be used to project a reduced complexity 3D image by selecting only a limited range of view levels. Given the right sample and the right setup and configuration, the final result could offer the viewer the opportunity to see something that might not otherwise be obvious.

Math Model

Figure 4:
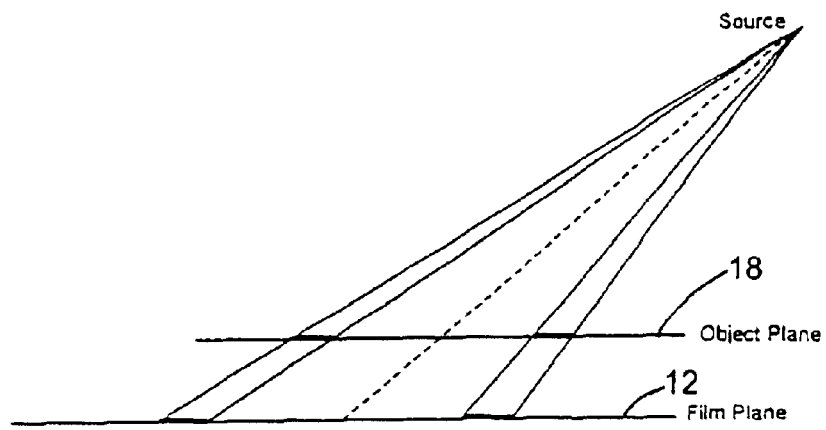
FIG. 4 is a schematic representation of a film mode simulation geometry wherein the object plane is parallel to the film plane and the geometric magnification projects uniform shadows of the features of the object plane.

The film mode simulation geometry works because the object plane is parallel to the film plane. Referring to FIG. 4, the geometry is such that the geometric magnification of projected shadows of the features of the object plane 18 is uniform. Thus the appropriate superposition of the film images places the projected shadows of the features of the view image plane in coincidence.

Figure 5:
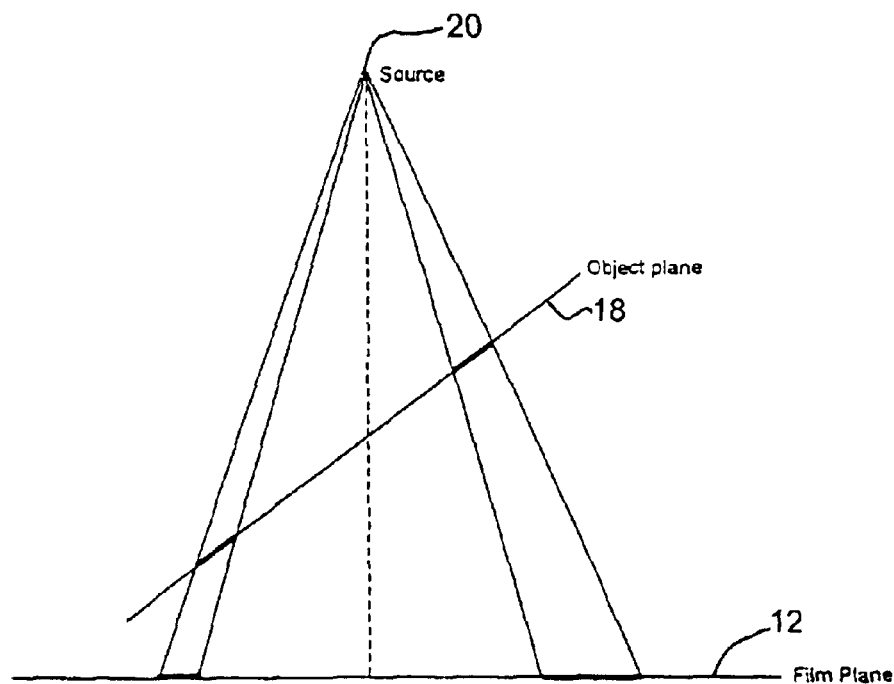
FIG. 5 is a schematic representation of an alternative geometry wherein the object plane is not parallel to the film plane and the geometric magnification varies over the film plane.

Referring to FIG. 5, in the alternate geometry, the object plane 18 is not parallel to the film plane and thus the geometric magnification varies over the film plane. Since the film is dimensionally fixed, it is therefore not possible to superposition the film so that the projected shadows of the features of the object plane are in coincidence. In order to form an image by combining alternate geometry projections, one must accommodate the variation of magnification.

If one were to specify the geometry of image formation sufficiently, one could mathematically trace a ray from the source 20, through the object space voxel to the image plane and compute to coordinate of the shadow of the voxel on the image plane. If done for each object rotation, the image data could be extracted and combined to form the estimate of the given object space voxel. Since the ray tracing process includes the geometric magnification effects, both the current and alternate geometries are applicable. As are many other geometries. The problem is in the specification of the geometry with sufficient accuracy and precision to achieve acceptable results.

Limits to Resolution

There are three primary factors limiting resolution. The first limitation is the spot size of the x-ray source 20. Each edge of the projected image has a penumbra caused by that spot size. Its dimension is the spot size times the distance between the object feature and the image plane divided by the distance between source 20 and the image plane. Since the usual spot size is in the order of a millimeter, the source distance in the order of a meter, and the feature distance is in the order of a few tens of millimeters, the penumbra is in the order of a few tens of thousandths of a millimeter or a few thousandths of an inch. The alternate geometry may have larger penumbra due to the larger distances between the object feature and the image plane. Using a smaller spot size and/or longer source distances can reduce this effect.

The second limitation is the pixel size of the image plate. Since data from eight or more images is used, its possible to obtain resolutions better than the pixel size of the image plate. Use of multiple images also tends to cancel a portion of the penumbra effect.

The third limitation is the specification of the geometry. Errors in the specification of the position of the source 20 have an effect similar in magnitude as the penumbra effect. Those errors are attenuated by the ratio of the source distance to feature distance. Errors in the identification of the center of rotation has a one to one impact. Errors in specification of the various angles are dependent upon the distance over which the error is communicated. Acceptable errors for the current image plate are on the order of a few hundredths of a degree.

With such tight tolerance of angles and dimensions, the geometry must be either very carefully measured or calibrated by using the system and specially constructed objects.

Specifying the Geometry

The assumption is that there is a fixed relationship between the source 20 and image plate, that the object is between the source 20 and the image plate, and that it is the object that is rotated about a fixed axis between each exposure cycle. If a means to measure the precise location and orientation of the source 20, the object, and image plate were to be developed, then it would be possible to remove this restriction. However, since the goal is to achieve a working system within the bounds of currently available technology, the above restrictions are necessary. Relatively simple input transformations can be used, if required, to adapt to precise and accurate location and orientation measurements The Coordinate System Looking at the system as it is presented in FIGS. 11 and 12, the X axis is left to right, the Y axis is vertical, and the Z axis is in and out. The origin of the system is the outer left most pixel on the image plate. One coordinate increment is equal to one pixel. This makes the image plate coincident with the X, Z plane. The X, Z plane in the new coordinate system is the same as the X, Y plane of the original system. The change is necessitated by the three dimensional (3D) math required by the alternate geometries. The original geometry only required two dimensional (2D) math.

Dimensions to Specify

1. The source to image plate distance (source distance)
2. The image plate dimensions (width in Z axis, height in X axis)
3. The image plate pixel size (from vendor)
4. The center of rotation to image plate distance (object distance)
5. The object radius of interest (from operator)

The source to image plate distance is not critical. Errors are diminished by the ratio of the feature to image plate distance to the source to image plate distance.

The image plate dimensions and pixel size are given by the manufacturer.

The center of rotation to image plate distance is also not critical. It is used to compute the object plane level offset so that one can specify the view level as distance from the base of the object.

The object radius of interest is perhaps the least critical. It simply sets the computed image size. It is necessary that it is sufficient to include the features of interest but not so large as to unnecessarily extent the computation time.

Angles to Specify

1. The source to image plate plane angle in the YZ and XZ planes (source angle)
2. The object axis of rotation to image plate plane angle in the YZ and XZ planes (object angle)
3. Rotation angle of object for each image (rotation angle)

The source to image plate plane angles and the object axis of rotation to image plate plane angles are manufactured and/or measured as closely as reasonably possible. Small errors can be measured using the system and specially constructed objects and corrections can be computed. If the manufacture or measurement is precise and accurate enough, corrections won't be required, in which case the ray tracing method is not limited to any particular geometries.

It is apparent from our current system that the manufacture of the means to set the rotation angle of the object is sufficiently precise and accurate for the existing image plate.

Calibrating the Geometry

Figure 6:
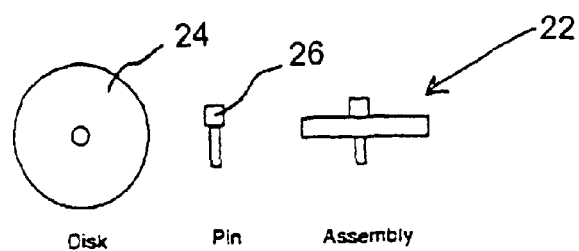
FIG. 6 depicts a marker in the existing system in which the object is a round marker disk with a central pin made of a material suitably opaque to x-rays.

The existing system uses a two step geometry calibration. Referring to FIG. 6, the object 22 is a round marker disk 24 with a central pin 26 made of a material suitably opaque to x-rays.

Figure 7:
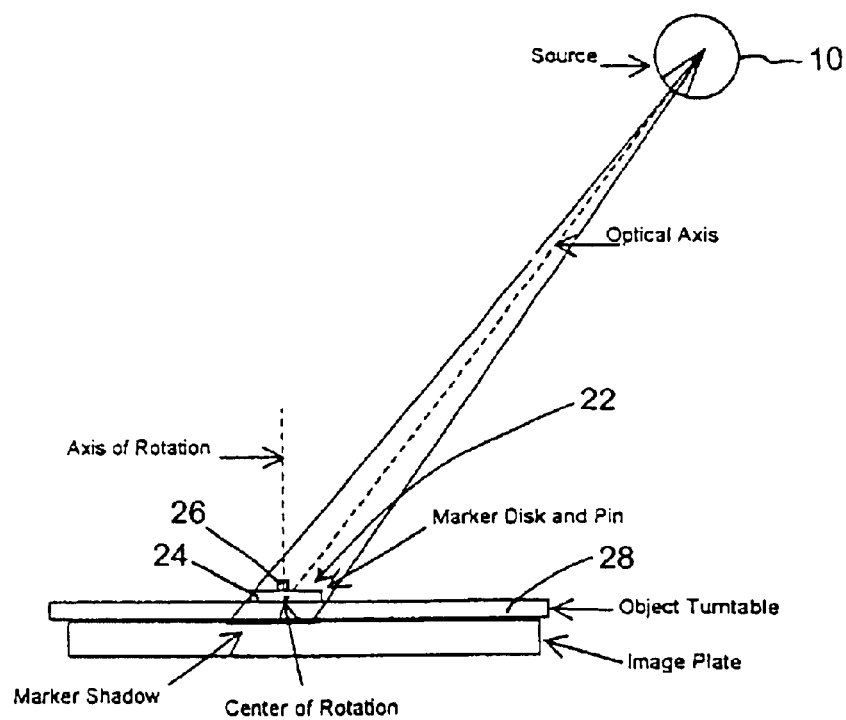
FIG. 7 depicts use of the disk and pin of FIG. 6 in a first step in calibrating the geometry of the system.
Figure 8:
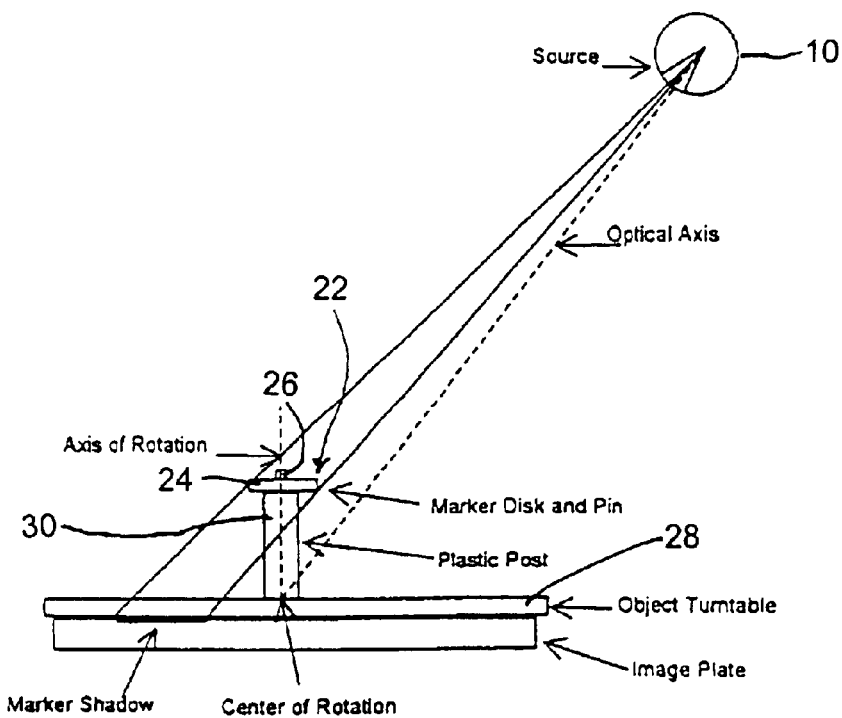
FIG. 8 depicts a plastic post with a similar pin at one end and hole to receive the pin of the round disk, inserted into the central hole of the object turntable in a second step in calibrating the geometry of the system.

Referring to FIG. 7, in the first step, the disk 24 is retained on the object turntable 28 via insertion of the bottom of the pin 26 through the disk 24 and into a hole in the center of the object turntable 28. An image is taken and is used to discover the coordinates of the center of rotation. In the alternate geometry, it can be used in the same manner Referring to FIG. 8, in the second step, a plastic post 30 carries the marker disk and pin assembly at its top end. The plastic post 30 has a similar pin at its bottom end, inserted into the central hole of the object turntable 28, and a hole at its upper end to receive the bottom of the pin 26 through the round disk 24. A second image is taken and is used to discover the misalignment coordinate. The central voxel shadow coordinate of the marker shadows is measured by the graphical interactive method, described above.

Figure 9:
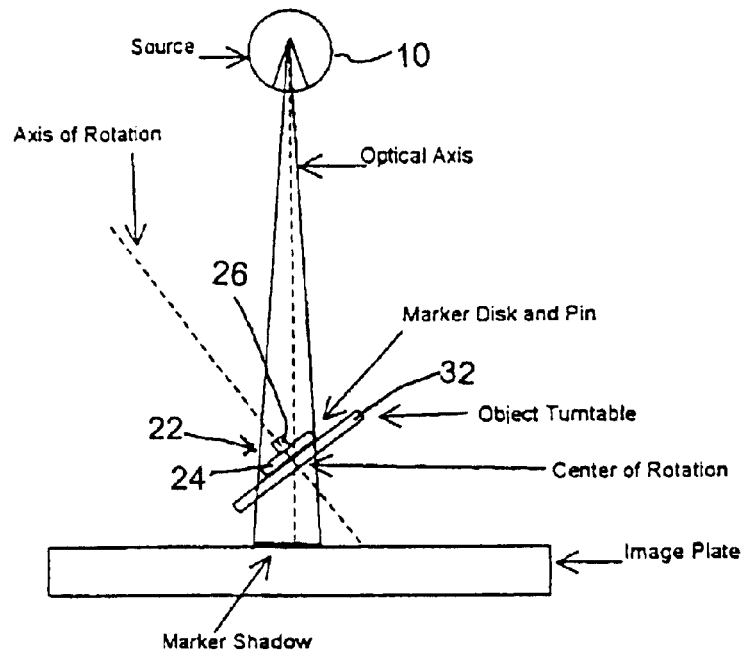
FIG. 9 depicts one method by which the marker disk and misalignment post are placed to calibrate the alternate geometry.
Figure 10:
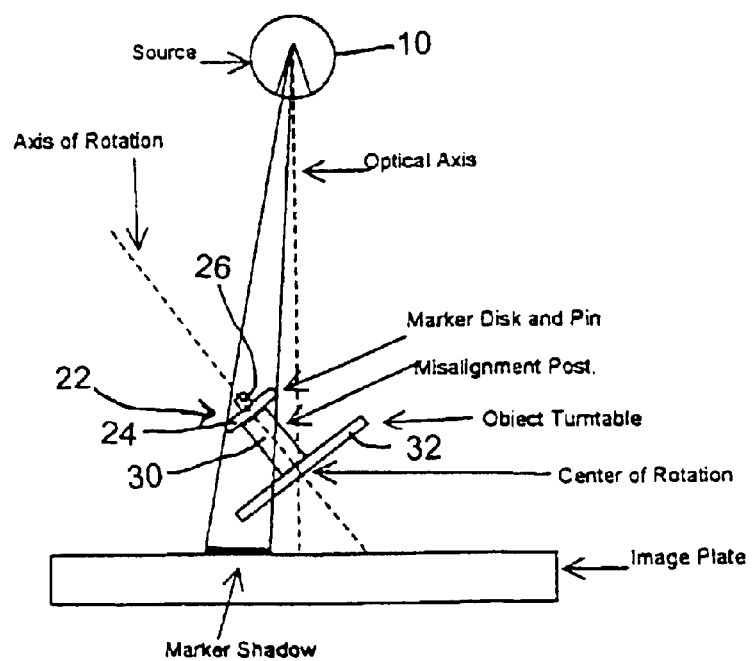
FIG. 10 depicts another method by which the marker disk and misalignment post are placed to calibrate the alternate geometry.

The center coordinate, the misalignment coordinate, the length of the plastic post 30, and the pixel size can be used to compute corrections for the source and object angles. This calibration technique is the subject of my U.S. patent application Ser. No. 09/709,586, filed Nov. 13, 2000, entitled "Tomosynthesis System and Registration Method," hereby incorporated herein by reference. However, it was not then extended to the alternate geometry. FIGS. 9 and 10 indicate how the marker disk 24 and misalignment post might be placed on an angled object turntable 32 to calibrate the alternate geometry. The calibration procedure comprises the following steps 1. Compute the coordinates of an ordered set of object voxel coordinates that form a foil
2. Use that coordinate set to compute the corresponding image shadow coordinates
3. Extract and combine image shadow coordinates to form view foil image pixels
4. Assign view foil image pixels to corresponding pixels in an image data array for presentation A procedure similar to the one used with the film mode simulation geometry could be used to compute and apply the corrections to the alternate geometry.

The alternate geometry may need one additional calibration step—the distance between the image plate and the center of rotation (object distance). Errors in that dimension affect the accuracy of measurement of feature size. Simple measurement should be enough because the effect of that error is the size of error divided by the source distance. However, one way to calibrate that dimension is to place two marker disk 24 and pin 26 assemblies a known distance apart on the object turntable 32, centered on the center of the turntable 32 and oriented so the line connecting the centers of the disks is parallel to the Z axis. The following relationship would be true:

Solving for object distance can give a calibrated estimate of the required dimension.

Ray Tracing Process

More particularly, the ray tracing process comprises the following steps:

1. Compute alignment calibration angles
   a. Acquire centroid of center calibration marker shadow in image plane
      i. Coordinate is X1a,Z1a by method in Appendix C
      ii. Note: the image plane is parallel with the XZ plane
      iii. Note: the origin of the image plane is at the coordinate system origin
   b. Acquire centroid of misalignment calibration marker shadow in image plane
      i. Coordinate is X1b,Z1b by method in Appendix C
      ii. Note: if Z1a equals Z1b there is no misalignment
   c. Compute misalignment angle in XZ plane
      i. Misalignment angle equals arctan((X1b−X1a)/(z1b−z1a))−90°
   d. Compute angle in XY plane
      i. Convert height of misalignment calibration post to pixel units
      ii. Source angle equals arctan((misalignment post height)/(X1b−X1a))
      iii. For current geometry, angle is source angle
         (1) Object angle is 0°
         (2) Presumes accurate construction
         (3) Implies object plane is parallel to image plane
         (4) Construction and calibration procedure seems adequate
      iv. For alternate geometry, angle is object angle
         (1) Source angle is 90°
         (2) Presumes accurate alignment of image plane to source path
         (3) Implies optical axis is normal to image plane
         (4) May need to develop a calibration procedure for source angle
2. Compute corrected 3D coordinates of source
   a. Transform source distance to pixel units
   b. Xs=X1a
   c. Ys=(source distance)×sin(source angle)
   d. Zs=Z1a
3. Compute equation of image plate plane
   a. Vector 1=(0,0,0),(0,(image width−1),0)
      i. Vx1=0
      ii. Vy1=image width−1
      iii. Vz1=0
      iv. M1=sqrt(Vx1^2+Vy1^2+Vz1^2)
   b. Vector 2=(0,0.0),(0,(image height−1),0)
      i. Vx2=0
      ii. Vy2=image height−1
      iii. Vz2=0
      iv. MZ=sqrt(Vx2^2+Vy2^2+Vz2^2)
   c. Normal Vector=the normalized cross product of Vector 1 and Vector 2
      i. Non-normalized vector
         (1) NVx=(Vy1×Vx2)−(Vx1×Vy2)
         (2) NVy=(Vz1×Vx2)−(Vx1×Vz2)
         (3) NVz=(Vx1×Vy2)−(Vy1×Vx2)
         (4) NM=sqrt(NVx^2+NVy^2+NVz^2)
      ii. Normalized Vector
         (1) NVx=NVx/NM
         (2) NVy=NVy/NM
         (3) NVz=NVz/NM
   d. Plane coefficient
      i. D=−NVx×Vx1−Nvy×Vy1−NVz×Vz1
4. For each object voxel in desired digitized tomography view foil
   a. Compute 3D coordinates of object voxel
      i. Transform engineering units coordinate to pixel unit coordinate
      ii. Two dimensional coordinate transformations in XZ plane
         (1) Rotate about axis of rotation to misalignment angle
         (2) Rotate about axis of rotation to incremental angle
      iii. For alternate geometry
         (1) Two dimensional coordinate transformation in XY plane
            (a) Rotate about center of rotation to object angle
            (b) Translate to the center of rotation
   b. Use results of 1 and 4a to create a 3D line
      i. (Xs,Ys,Zs),(Xo,Yo,Zo)
   c. Use results of 3 and 4b to compute intercept coordinates
      i. Dx=Xo−Xs;
      ii. Dy=Yo−Ys;
      iii. Dz=Zo−Zs;
      iv. mu=−(D+NVx×Xd+Nvy×Yd+NVz*Zd)/(NVx×Dx+Nvy×Dy+NVz×Dz)
      v. Xi=Xs+mu×Dx
      vi. Yi=Ys+mu×Dy
      vii. Zi=Zs+mu×Dz
   d. For each image
      i. Use results of 4c to extract projected ray pixel value
         (1) Method in Appendix B
   e. Combine pixel values from 4d by method in Appendix A
   f. Store result of 4e in destination digitized tomography view data matrix Appendix A—Variable Absorption Digital Image Combination Review of Absorption Digital Image Combination:

The process of producing a computed tomographic view from multiple digitized x-ray images requires the combination of the registered pixels from each of the digitized images. The usual method used is a simple summation or averaging of the pixels to be combined. This method results in an image containing many confusing artifacts and visual blurring.

The original absorption model for combining eight images is as follows:

The minimum pixel value was assigned a transmission fraction of 0.5

The maximum pixel value was assigned a transmission fraction of 1.0

All other pixel values were assigned a transmission fraction proportionately between 0.5 and 1.0

For each pixel location in the computed view

Start with a maximum pixel value

Successively multiply initial pixel value by the transmission fraction of that same pixel location in each of the eight images This can be accomplished using integer arithmetic as follows:

Combined pixel=maximum pixel value
For each of eight images in succession
   image pixel=image pixel+maximum pixel value
   image pixel=image pixel DIV 2
   image pixel=image pixel−maximum pixel value
   image pixel=image pixel*combined pixel
   image pixel=image pixel DIV maximum pixel value
   combined pixel=combined pixel+image pixel
Note: While floating point arithmetic could be used, integer arithmetic is much faster on most computers
Note: While eight images were used in the present case, the method could be adapted to other numbers of images Variable Absorption Digital Image Combination:

While the fixed absorption model gives generally good results, other values of absorption can give improved results for some exams. For example, exams of very dense objects can benefit from higher absorptions while exams with low density areas of interest can benefit from lower absorptions.

The fixed absorption model has been modified to allow variable absorption using integer arithmetic as follows:

Combined pixel=maximum pixel value
For each of eight images in succession
image pixel=image pixel+maximum pixel value
image pixel=image pixel DIV 2
image pixel=image pixel−maximum pixel value
image pixel=image pixel*combined pixel
image pixel=image pixel DIV maximum pixel value
image pixel=image pixel*scaled absorption fraction
image pixel=image pixel DIV scaling factor
Combined pixel=combined pixel+image pixel If the absorption fraction is one, the results are as before. Given an absorption fraction greater than one, the effect is to increase the absorption. An absorption fraction less than one results in a decrease of absorption effect. Visual results are as expected.

Appendix B—High Resolution Digital Image Manipulation

Review of between pixel value calculation:

A digitized image is a rectilinear matrix of numbers. Each number represents the integral intensity of a small area of the original object, picture, or transparency. In order to transform the matrix to an image the eye can use, hardware must be provided such that each number can be presented as a small area of light or dark on a video display or printing device.

When the eye looks at a small area of light, a perception of brightness results from an integration of area and intensity. That is a small area of bright will look as bright as a slightly larger area of slightly less brightness. This understanding lead to the following method of determining the value of a pixel whose coordinate fell between pixels.

Given:

A two dimensional matrix of pixel values for a source image

A fractional coordinate of a pixel value to determine coordinate=x.fx,y.fy,

Where:
   x,y=the integral coordinate
   fx=the fractional x coordinate
   fy=the fractional y coordinate There are four nearest pixels in the source image
Upper left=x,y
Upper right=x+1,y
Lower left=x,y+1
Lower right=x+1,y+1

There are four areas joining at x.fx,y.fy which are proportional to
Upper left=fx*fy*aspect ratio
Upper right=(1−fx)*fy*aspect ratio
Lower left=fx*(1−fy*aspect ratio)
Lower right=(1−fx)*(1−fy*aspect ratio)
Where:
aspect ratio=y pixel resolution/x pixel resolution The eye will weight the four nearest pixels proportional to the opposing areas Between pixel value=(Upper left value*lower right area+Upper right value*lower left area+Lower left value*upper right area+Lower right value*upper left area)/aspect ratio Applications of between pixel value calculation:

The between pixel value calculation is currently used for two applications in the DT33 and DT36 programs:

Rotation and translation of digitized images
Forming the measure feature profile line Tests have been performed yielding very good results for two more applications:

Digitized image magnification
Extended high resolution reference mark find

Several additional applications are possible:

Variable image area selection
Calculation of arbitrary z-axis view
Correction of digital image distortion
Magnification
Aspect ratio
Non-linear distortion Review of rotation and translation of digitized images:

The digitized images must be rotated and translated for two reasons:

1 The acquired image must be rotated and translated to a standard reference rotation and position
2 The set of images for an exam must be rotated and translated so that the image combination will yield the computerized tombgraphic view at the desired level Given:
a two dimensional matrix of pixel values for a source image,
a two dimensional matrix of pixel value locations for a destination image,
a coordinate of the image center of rotation,
a reference coordinate for the image center of rotation,
an angle to rotate about the image center of rotation,
an x displacement of the image center of rotation,
a y displacement of the image center of rotation,
transform each integral coordinate in the destination image into a fractional coordinate in the source image:
   x.fx=(x destination−source center x−x displacement)*COS(rotation angle)+(y destination−source center y+y displacement)*SIN(rotation angle)−(2.0*source center x−reference x)
   y.fy=(x destination−source center x−x displacement)*SIN(rotation angle)+(y destination−source center y+y displacement)*COS(rotation angle)+(2.0*source center y−reference y)

Compute the between pixel value in the source image at x.fx,y.fy and place it in the destination pixel location x destination,y destination.

Review of forming the measure feature profile line:

The operator selects two points on the image which are the ends of a line passing through the feature of interest.

Given the coordinates of the two points xl,yl and x2, y2, Compute the slope of the given line:

IF x1<>x2 THEN slope=(y2−y1)/ (x2−x1)

ELSE slope=sign of (y2−y1)1E20 or similar large number

Compute the intercept of the given line:

intercept=y1−slope*x1

For each one pixel distance between the two points on the line compute the fractional coordinate:

Compute:

x increment=SQRT(1/(1+SQR(slope)))
y increment=slope*x increment
x.fx=x1+x increment*number of pixels from x1, y1
y.fy=y1+y increment*number of pixels from x1,y1

For each fractional coordinate compute the between pixel value to be the corresponding feature profile line pixel value.

Digitized image magnification:

Previous applications were based upon the fractional coordinates being one image pixel apart. If the fractional coordinates are spaced closer than one pixel apart the destination image can be effectively magnified. That is if they are ½ pixel apart the effective magnification would be 2×; ¼ pixel apart would be 4× and so on.

When such a magnification is done the result is a smooth magnification of the digitized image-that appears much like the image produced by a magnifying glass. The customary approach to the magnification of a digital image is the simple square replication of each pixel. That is for a 2× magnification each pixel is replicated into a 2 by 2 square. The resulting image appears magnified but has a square tile effect which reduces the eyes ability to see the shape of the magnified features.

Magnification of digital images is becoming more important as the resolution of image digitizers and digital display devices improves. Current resolution is such that it is difficult to see features that are a few pixels in size. This trend is expected to continue.

Extended high resolution reference mark find:

The current method of locating the center of the registration reference marks is as follows:

The operator points to the inside of the reference mark.

The computer scans on the x and y axis until it finds a maximum in the slope of the image intensity higher than the noise peaks.

The fractional coordinates of the maximum slope is determined.

The position of the maximum is determined by using the maximum slope along with the preceding and following slope values to form a second order curve.

The position of the maxima of the second order curve is assumed to be the position of the edge.

The trial center of the mark is then computed as the mean x,y coordinate.

The computer then takes the trial center and similarly computes a second trial center.

The compute then takes the second trial center and computes the final center coordinate.

Since the reference marks are ellipsoidal:

The center coordinate of both reference marks are determined.

The errors in angle and position are computed.

The rotation and position of the image is adjusted by the rotation and translation procedure.

The computer then determines the new center coordinates of the reference marks.

The sequence is repeated until the errors in angle and position are reduced below a small amount.

An extended method can be as follows:

The operator points to the inside of the reference mark.

The computer scans on the x and y axis until it finds a maximum in the slope of the image intensity higher than the noise peaks.

The fractional coordinates of the maximum slope is determined.

The position of the maximum is determined by using the maximum slope along with the preceding and following slope values to form a second order curve.

The position of the maxima of the second order curve is assumed to be the position of the edge.

The trial center of the mark is then computed as the mean x,y coordinate.

The computer then takes the trial center and similarly computes a second trial center.

The compute then takes the second trial center and computes the final center coordinate.

Do the above for both reference marks.

Compute the angle and positional error.

Use the same method used to create a feature profile line to produce an x,y scan across the reference marks whose angle is adjusted for the angular error found above.

In a similar manner find the fractional coordinates of the maximum slope in the pixel intensity.

Compute the center coordinates for both reference marks as the mean coordinate of each.

Compute a revised angle and position error.

Repeat the second process until the computed angle and position error changes less than some small amount.

The advantage of this extended method is that the true error in angle and position of the image is determined without the time consuming multiple rotation and translation adjustment. This becomes vary important as the resolution of the digitized image improves. Current images are 3.1 meg pixels with a possible 12.6 meg pixels soon. The higher resolution image will take too much time and memory to allow such adjustment.

Variable image area selection:

The current method of image area selection is as follows:

The image is adjusted to standard position and rotation.

The operator selects a packing fraction:

1 to 1

4 to 1

9 to 1

16 to 1.

The central area of the source image is packed into the destination image area.

This method has several problems:

The time and memory required to adjust the digitized image to standard position and rotation.

The inflexibility of the integral pixel packing approach not allowing optimum sizing of the area of interest after digitization.

Demagnification of the digitized image should be possible in a manner vary similar to the magnification discussed above. Compute the fractional coordinates so that they are more than a source pixel apart. Any arbitrary demagnification should be able to be achieved.

Rotation and translation could be accomplished at the same time by using the extended reference mark find method coupled with the coordinate transformation procedure above. Thus the excessive time and memory required for the current method could be eliminated along with allowing an optimum selection of the area of interest.

Calculation of Arbitrary Z-Axis View:

The current method of computation of a z-axis view is limited to any x or y line in the currently formed computed tomography view series. A specific x or y line is taken from each stored computed tomographic view and displayed side by side. This is not quite satisfactory because:

The entire series must be created first.

Too much time is taken read all of the data from the disk.

The feature of interest may not be along the x or y axis.

The feature of interest may in fact be curved.

An alternative can be:

The operator selects an arbitrary path on one view.

A list of fractional coordinates one pixel apart are generated from that path or possibly magnified or demagnified as required.

Transform that list so that the appropriate rotations and translations are included.

Acquire pixel data along that transformed path by the above between pixel method.

Combine the pixels by the currently used absorption method.

Present the computed paths side by side.

Correction of digital image distortion:

If an array of fractional coordinates can be computed to correct for the distortion in a digital image, the above between pixel calculation can be used to correct that distortion. Thus linear distortion such as magnification or aspect ratio can be corrected with ease. Non-linear distortion such as that resulting from a variable speed scanning camera could be corrected if that non-linearity were adequately known.

Appendix C—High Resolution Registration of Digital Images

Introduction

The coordinate system to be used in this disclosure is as follows:

The film is placed at the image plane.

The image plane is the x, y plane.

The image plane is tilted at some angle with respect to a base plane.

The y axis is parallel to be base plane.

The image is formed by x-rays projecting a shadow of an object at or near the image plane.

Multiple images are formed by rotating the object about an axis of rotation

The z axis is parallel to the axis of rotation.

The intersect of the axis of rotation and the image plane is the center of rotation.

The center of rotation is the desired origin of the coordinate system.

Previous disclosures described a method of using reference marks to transfer the registration of the object to the computer. Several methods of locating and using the centers of those markers were discussed.

As the image resolution is pushed to higher levels, registration becomes a more demanding problem to be solved. For digitized tomography brand computerized tomography to work at its best, the multiple digitized images must be in registration to within a pixel.

After digitization of the x-ray images, the two registration marks centers are located, the apparent center of rotation is computed based upon a previously established relationship between the registrations marks and the center of rotation.

The image is then moved to a standard position and rotation:

The line joining the centers of the registration marks is parallel to the y axis.

The center of rotation is positioned at the center of the digital image.

Since the acquired images must be rotated to form the final CT view, the quality of the result is vary sensitive to variations in registration along the y axis. This is especially true as the area of interest is more distant from the center of rotation.

When working with pixels as small as a few mills, the projected image of the reference marks becomes an ellipse rather than a circle. Center find routines based upon the assumption of a circle fail to locate the center of the mark to within the required fraction of a pixel. In fact, variations in the position of the final image of more than five pixels, have been observed.

Methods have been developed that markedly reduces this problem. Review of previously disclosed center find methods:

Step Description

1 Locate the coordinates of all reference mark edge pixels
2 Compute mean x and y coordinate
3 Use computed x, y coordinate as center of reference mark Method One:
Step Description 1 Use mouse to point to inside of reference mark.
2 Use pointed to pixel as starting point.
3 Scan along the x axis to find maxima or minima of differential of pixel level.
4 Compute x coordinate of left and right edge of reference mark as position of maxima or minima of differential.
5 Compute mean x coordinate.
6 Scan along the y axis to find maxima or minima of differential of pixel level.
7 Compute y coordinate of top and bottom edge of reference mark as position of maxima or minima of differential.
8 Compute mean y coordinate.
9 Use computed mean x,y coordinate as center of reference mark Method two—in use:

Method Two:
Step Description

1 Use mouse to point to inside of reference mark.
2 Use mouse to point to outside of reference mark.
3 Use pointed to inside pixel as starting point.
4 Use a threshold pixel level based upon the pointed to inside and outside pixel levels.
5 Scan along the x axis until the first pixel equal to or less than the threshold level is found.
6 Use the x coordinate of the found pixel as the right and left edge x coordinate.
7 Compute the mean x coordinate.
8 Scan along the y axis until the first pixel equal to or less than the threshold level is found.
9 Use the y coordinate of the found pixel as the top and bottom edge y coordinate.
10 Compute the mean y coordinate.
11 Use computed mean x,y coordinate as the center of reference mark Improvements being tested.

Method Two Improvement:

Instead of using the coordinate of the pixel equal to or less than the threshold level, use the interpolated factional coordinate:

Left coordinate=x coordinate+((pixel x+1 level)−threshold)/((pixel x+1 level)−(pixel x level))

Right coordinate=x coordinate−((pixel x level)−threshold)/((pixel x level)−(pixel x−1 level))

Top coordinate=y coordinate+((pixel y+1 level)−threshold)/((pixel y+1 level)−(pixel y level))

Bottom coordinate=y coordinate−((pixel y level)−threshold)/((pixel y level−(pixel y−1 level))

This improvement changes method two resolution to much better than its previous one half pixel.

Improved estimation of center of reference mark:

Using either method one or two locate the approximate center of the reference mark. Use the first found value of the center as the starting point of a second approximation of the center.

This improvement changes the reproducibility of the found center to better than one tenth of a pixel. Positioning by method of successive approximation:

Step Description

0 Use one of the previously disclosed methods of finding the centers.
1 Compute the angle error and center of rotation of the image.
3 Adjust the image to an approximate standard position and rotation.
4 Find the new centers of the reference marks using the same find method.
5 Compute the new angle error and center of rotation.
6 If the new angle error and center of rotation are too large go to step 3.

This improvement changes the reproducibility of the rotation and position of the image to better than five hundredths of a degree and one pixel.

This method can be performed using the current software. However, it requires repeated operator interaction and a substantial amount of time for the repeated adjustment to standard position and rotation.

Step Description

1 Find the centers of the reference marks by either improved method.
2 Use the right, left, top, and bottom coordinates to determine the size of the reference mark.
3 Use the same method used in the measure image feature to create the pixel pattern across the reference marks as follows:
  a: The diameter plus a small amount through the center parallel to the line between centers.
  b: The diameter plus a small amount through the center perpendicular to the line between centers.
4 Determine the maximum and minimum pixel level in the pixel patterns.
5 Compute the edge coordinates of the half way level in each pattern.
6 Use the mean coordinates as the center coordinates for step 3 until the difference between the new center and the previously found center is less than a to be specified fraction of a pixel.
7 Use the final found centers as a basis for adjusting the digital image to standard position and rotation.

This method can have the advantage of requiring only one sequence of operator actions and only one adjustment to standard position and rotation.

Review of the measure image pixel pattern:

Step Description

1 Determine two different position coordinates on the image.
2 Compute the equation of the line between the two coordinates.
3 Compute the image coordinates of one pixel increments along that line.
4 Determine the pixel value at each pixel pattern coordinate:
  a: The pixel pattern coordinates may be fractional coordinates.
  b: The image pixels are at integral coordinates.
  c: The pixel value will be determined by the same method used by the rotate—translate routine—an opposing area weighted mean of the nearest four pixel values.

Appendix D—Axial Misalignment Calibration for Non-Film X-Ray Device Images

The digitized tomography process requires very precise image registration for it to produce high quality computed images. The requirement is such that every pixel in every source image must be known to the process to within a fraction of a pixel. A method has been developed that provides for such high resolution image registration of film x-ray images. It consisted of a fixture, a setup process, and calibration procedure that assured a very specific geometry of exposure and allowed each digitized film image to be transformed into a standard registration and format. It was specifically because the x-ray source was position immediately overhead the center of rotation of the fixture and the fixture was tilted to the desired angle that axial misalignment of the x-ray images was not encountered.

The current digitized tomography calculations assume the path between the center of the x-ray source and the center of rotation of the non-film fixture's turntable 28 falls on a plane that is perpendicular to the non-film image plate's surface, parallel to the long axis (the "Y" axis) of the non-film image plate, and passes through the center of rotation of the fixture's turntable 28. Since the current fixture is placed horizontally and the x-ray source is moved to the side and angled toward the center of rotation, an axial misalignment is possible without using special alignment procedures and tools. Even a small misalignment can cause serous degradation of the resultant computed digitized tomography views.

Currently, the center of rotation is calibrated using an image of a circular marker placed at the center of rotation in a manner identical to the method used to identify the center of rotation of film images. Because all images can be taken with an identical registration, the three reference mark technique used with film images is not required. However, a second reference mark must be used to measure the axial misalignment of the x-ray optical axis. That marker may be of the same size and material as the center reverence mark but must be displace above the center of rotation by some distance. Since the center position of the marker can be determined to approximately ½ of a pixel width, that distance need only be approximately ½ the maximum possible image radius. The current image plate is 2304 pixels wide with a 200 pixel "gutter" along one edge. That makes the effective radius (2304−200)/2=1145 pixels at 0.005 inches per pixel, that would be 5.724 inches. One half of that would be 2.86 inches.

Using the center coordinates of the two reference markers, the axial misalignment angle can be determined and a correction to the digitized tomography calculations can be applied to the "X" and "Y" axis displacement values. The process is as follows:

Let x1,y1 be the pixel coordinate of the center of the center reference mark image. Let x2,y2 be the pixel coordinate of the center of the elevated center reference mark image. Let the x-ray optical axis be more or less parallel to the "Y" axis in the positive direction. The distance between centers of the reference marks can be computed by taking the square root of the sum of the squares of the differences between the first and second coordinates: distance=sqrt((x1−x2)*(x1−x2)+(y1−y2)"(y1−y2)). That distance can be divided into the differences between the coordinates to compute the sine and cosine of the misalignment angle: sine of misalignment angle=(x2−x1)/distance and cosine of misalignment angle=(y2−y1)/distance.

The displacement is the normally calculated displacement value and is computed as a function of the image level. The "X" axis displacement value can be computed as the displacement times the sine of the misalignment angle and the "Y" axis displacement value can be computed as the displacement times the cosine of the misalignment angle.

The adjusted displacements are applied to their respective axis calculations as described elsewhere.

Appendix E—Basic 3D Math

This article is part of The Win95 Game Programmer's Encyclopedia

Basic 3D Math

Introduction

The Win95GPE article on basic 2D math lays a lot of the ground work for understanding the information in this article. This section contains some of the basic high-school math needed to understand the equations and graphics primitives used in 3D computer graphics. 3D math is often just a simple extension of the same techniques used for 2D math. An aid to understanding 3D math is to think of it as simply another programming language.

Definition of a 3D Point

Figure 11:
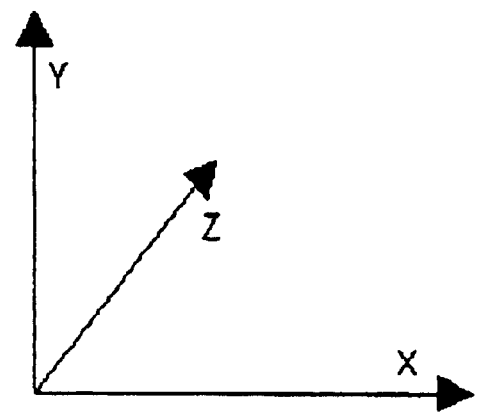
FIG. 11 shows the representation of 3D space in a "left-handed" coordinate system, used in 3D mathematics.

A point is similar to it's 2D counterpart, we simply add an extra component, Z, for the 3rd axis, as shown in FIG. 11. Points are now represented with 3 numbers: <x,y,z>. This particular method of representing 3D space is the "left-handed" coordinate system, which I use throughout this entire article. In the left-handed system the x axis increases going to the right, the y axis increases going up, and the z axis increases going into the page/screen. The right-handed system is the same but with the z-axis pointing in the opposite direction.

Distance Between Two 3D Points

The distance between two points <Ax,Ay,Az> and <Bx,By,Bz> can be found by again using the pythagorus theorem:

$$dx=Ax-Bx$$

$$dy=Ay-By$$

$$dz=Az-Bz$$

$$distance=sqrt(dx*dx+dy*dy+dz*dz)$$

Definition of a 3D Vector

Like it's 2D counterpart, a vector can be thought of in two ways: either a point at <x,y,z> or a line going from the origin <0,0,0> to the point <x,y,z>.

3D Vector addition and subtraction is virtually identical to the 2D case. You can add a 3D vector <vx,vy,vz> to a 3D point <x,y,z> to get the new point <x',y',z'> like so:

$$x'=x+vx$$

$$y'=y+vy$$

$$z'=z+vz$$

Vectors themselves can be added by adding each of their components, or they can be multiplied (scaled) by multiplying each component by some constant k (where k< >0). Scaling a vector by 2 (say) will still cause the vector to point in the same direction, but it will now be twice as long. Of course you can also divide the vector by k (where k< >0) to get a similar result.

To calculate the length of a vector we simply calculate the distance between the origin and the point at <x,y,z>:

$$length = |<x, y, z> - <0, 0, 0>|$$

$$sqrt((x-0)*(x-0)+(y-0)*(y-0)+(z-0)*(z-0))$$

$$sqrt(x*x+y*y+z*z)$$

Often in 3D computer graphics you need to convert a vector to a unit vector, i.e., a vector that points in the same direction but has a length of 1. This is done by simply dividing each component by the length:

Let <x,y,z> be our vector, length=sqrt($x*x+y*y+z*z$)

$$\text{Unit vector} = \frac{<x, y, z>}{\text{length}} = \left|\frac{x}{\text{length}}, \frac{y}{\text{length}}, \frac{z}{\text{length}}\right|$$

(where length=|<x,y,z>|)

Note that if the vector is already a unit vector then the length will be 1, and the new values will be the same as the old.

Definition of a Line

As in 2D, we can represent a line by it's endpoints (P1 and P2) or by the parametric equation:

$$P=P1+k*(P2-P1)$$

where k is some scalar value between 0 and 1.

The Dot Product

The dot product between two vectors <Ax,Ay,Az> and <Bx,By,Bz> is calculated like so:

$$A*B=Ax*Bx+Ay*By+Az*Bz$$

If A and B are unit vectors then the dot product is the cosine of the angle between them, so the angle itself can be calculated by taking the inverse cosine of the dot product:

$$theta=invcos(A*B)$$

Fortunately you'll often only need the cosine of the angle between 2 vectors and not the angle itself, so the expensive step of calculating the inverse cosine can be skipped.

Definition of a Plane

Figure 12:
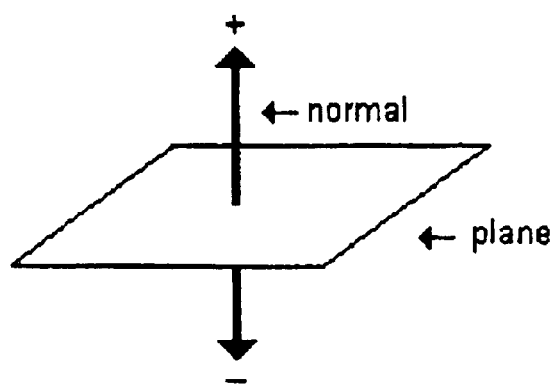
FIG. 12 illustrates a plane showing normal as the direction that the surface of the plane is facing, used in 3D mathematics.

A plane is an infinitely wide flat polygon-type surface. A plane can be defined by a normal <nx,ny,nz> and a scalar value k. The normal can be thought of as representing the direction that the surface of the plane is facing, i.e., it's a directional vector at a right angle to the plane, as shown in FIG. 12. We can imagine the normal as describing an infinitely long line stretching off to infinity in either direction, and that a plane can slide up and down along this line. In the plane equation the value k specifies where exactly on this line the plane sits.

The equation for the plane uses the dot product:

$$<x,y,z> * <nx,ny,nz> = k$$

All points <x,y,z> that actually lie on the plane itself will satisfy this equation. This gives us a convenient method for determining which side of a plane any given point <x,y,z> is:

$<x, y, z> * <nx, ny, nz> = k$   Point is in plane $<x, y, z> * <nx, ny, nz> > k$   Point is on one side of plane $<x, y, z> * <nx, ny, nz> < k$   Point is on other side of plane The vector <nx,ny,nz> and scalar k are unique to every plane (a way of calculating them is shown below). These equations are helpful in performing back-face culling. Substitute the view point into the equation, if the value comes out less than k then you know that you are facing the "back" side of the polygon and thus don't need to draw it.

The Cross Product

If you have 2 vectors then the cross product will return a vector which is perpendicular (i.e., at a right angle).to both of them. The cross product between two vectors <Ax,Ay,Az> and <Bx,By,Bz> is:

$$A \times B = <Ay^*Bz - Az^*By, Az^*Bx - Ax^*Bz, Ax^*By - Ay^*Bx>$$

Note that while the dot product returns a single scalar value, the cross product returns a vector.

Taking the cross-product between the x axis <1,0,0> and y axis <0,1,0> gives us:

$<1, 0, 0> \times <0, 1, 0> = <0*0 - 0*1, 0*1 - 1*0, 1*1 - 0*0>$ $= <0, 0, 1>$ which is of course the z axis and is indeed perpendicular to both vectors.

Calculating a Plane from 3 Points

Figure 13:
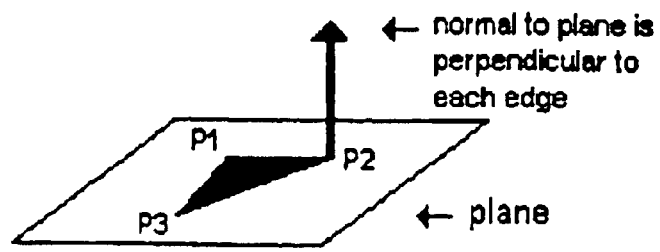
FIG. 13 illustrates the calculation of a plane from 3 given points, used in 3D mathematics.
Figure 14:
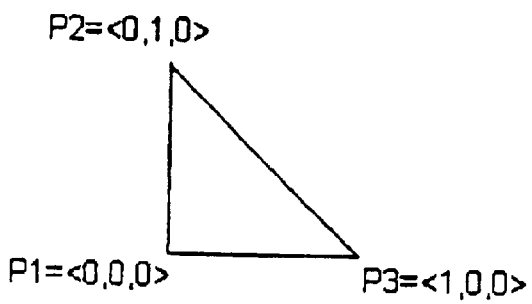
FIG. 14 illustrates 3 points stored in a clockwise direction in the x/y plane, used in 3D mathematics.

To calculate a plane from 3 given points we first calculate the normal. If we imagine the 3 points form three edges in the plane then we can take two of the edges and calculate the cross-product between them. The resulting directional vector will be the normal, and then we can plug any of the 3 known points into the plane equation to solve for k. For points p1,p2 and p3 we get:

$$normal = (p1-p2) \times (p3-p2)$$

$$k = normal * p1$$

as shown in FIG. 13. Note that it is extremely important to keep track of which direction your points are stored in. Take 3 points stored in clockwise direction in the x/y plane, as shown in FIG. 14. The normal to the plane these 3 points define is:

$normal = (p1 - p2) \times (p3 - p2)$ $= (0, -1, 0) \times (1, -1, 0)$ $= <(-1)*0 - 0*(-1), 0*1 - 0*0, 0*(-1) - (-1)*1>$ $= <0, 0, 1>$ i.e., the z axis. If we were to store the points counter-clockwise the normal calculated would be <0,0,-1>, which is still the z axis but in the "opposite" direction. It's important to keep track of these things since we often need plane equations to be correct in order to determine which side of a polygon an object (such as the view point) is on.

3D Rotation

In the Win95GPE article on basic 2D math we saw how a 2D point <x,y> can be rotated around the origin <0,0>. In 3D this is the same as rotating the point around the z axis (the z value remains the same). We can slightly modify this basic equation to get rotation around all three axis:

Rotation about the x axis:

$x' = x$ $y' = (\cos é * y) - (\sin é * z)$ $z' = (\sin é * y) + (\cos é * z)$

Rotation about the y axis:

$x' = (\cos é * x) + (\sin é * z)$ $y' = y$ $z' = -(\sin é * x) + (\cos é * z)$

Rotation about the z axis:

$x' = (\cos é * x) - (\sin é * y)$ $y' = (\sin é * x) + (\cos é * y)$ $z' = z$

Rotating a point around an arbitrary axis is a tad complex, so I'll discuss how to do this in the article on matrices (since they're an ideal tool for performing these types of rotations). It's fairly easy to expand the steps in that article for "regular" 3D math.

Intersections

This section shows how to calculate intersections between various objects. This is particularly handy for things like collision detection.

Intersection Between a Line and a Plane

This occurs at the point which satisfies both the line and the plane equations.

Line equation: $p = org + u*dir$   (1)

Plane equation: $p*normal - k = 0$.   (2)

Substituting (1) into (2) and rearranging we get:

$(org + u*dir)*normal - k = 0$ i.e., $u*dir*normal = k - org*normal$ i.e., $u = (k - org*normal)/(dir*normal)$ If (d*normal)=0 then the line runs parallel to the plane and no intersection occurs. The exact point at which intersection does occur can be found by plugging u back into the line equation in (1).

Intersection Between a Line and a Sphere

This occurs at the point which satisfies both the line and the sphere equations.

Line equation: $p = org + u*dir$   (1)

Sphere equation: $|p - origin| = radius$   (2)

Substituting (1) into (2) we get:

$|(org + u*dir) - origin| = radius$ i.e., $(org + u*dir - origin)^2 = radius^2$

Which can be rearranged into the following form:

$$u^2*dir^2+u*2*dir*(org-\text{origin})+(org-\text{origin})^2$$

This is a quadratic equation in u which can thus be solved with the following formula:

$$u=-B+/-sqrt(B^2-4AC)2A$$

where A=dir^2

B=2*dir*(org-origin)

C=(org-origin)^2

Note that dir^2 means dir*dir, i.e., the dot product of dir with itself. The same applies to org-origin in C. dir*(org-origin) in B is also a dot product.

To get the actual points of intersection you plug the 2 resulting u values into the line equation.

If A=0 then the line does not intersect the sphere. If sqrt(B^2-4AC)=0 then the line is tangent to the surface of the sphere and there is only one point of intersection at u=-B/2A.

Intersection Between Three Planes

In order to find the point <x,y,z> of intersection between three planes (p*n1-k1=0, p*n2-k2=0 and p*n3-k3=0) we can use matrices (Appendix F; in particular read the section on solving simultaneous equations). If we place all three equations into a matrix then we can see that the following rule will apply:

$$\begin{vmatrix} n1.x & n1.y & n1.z & -k1 \\ n2.x & n2.y & n2.z & -k2 \\ n3.x & n3.y & n3.z & -k3 \\ 0 & 0 & 0 & 1 \end{vmatrix} \times \begin{vmatrix} x \\ y \\ z \\ 1 \end{vmatrix} = \begin{vmatrix} 0 \\ 0 \\ 0 \\ 1 \end{vmatrix}$$

By rearranging this equation we can solve for <x,y,z>:

$$\begin{vmatrix} x \\ y \\ z \\ 1 \end{vmatrix} = \begin{vmatrix} n1.x & n1.y & n1.z & -k1 \\ n2.x & n2.y & n2.z & -k2 \\ n3.x & n3.y & n3.z & -k3 \\ 0 & 0 & 0 & 1 \end{vmatrix}^{-1} \times \begin{vmatrix} 0 \\ 0 \\ 0 \\ 1 \end{vmatrix}$$

Thus if we calculate the inverse of the matrix then the 4th column will contain the point of intersection. (If the matrix has no inverse then at least two of the planes are parallel and there is no point of intersection).

Note that because of the constant terms we could instead use a 3×3 matrix for a more optimized solution:

$$\begin{vmatrix} x \\ y \\ z \end{vmatrix} = \begin{vmatrix} n1.x & n1.y & n1.z \\ n2.x & n2.y & n2.z \\ n3.x & n3.y & n3.z \end{vmatrix} \times \begin{vmatrix} k1 \\ k2 \\ k3 \end{vmatrix}$$

Intersection Between Two Planes

The line (p=org+u*dir) of intersection between two planes (p*n1-k1=0 and p*n2-k2=0) is perpendicular to each plane's normal, i.e.:

$$dir=n1 \times n2$$

What we can now do is assume there is a third plane perpendicular to both planes, i.e., one which has a normal of dir. All that remains is to find the k value for this plane and then find the point of intersection between all three planes, as shown in the previous section. For simplicity we can assume this third k value to be 0 and use the resulting point as our org value:

$$\begin{vmatrix} org.x \\ org.y \\ org.z \\ 1 \end{vmatrix} = \begin{vmatrix} n1.x & n1.y & n1.z & 0 \\ n2.x & n2.y & n2.z & 0 \\ dir.x & dir.y & dir.z & 0 \\ 0 & 0 & 0 & 1 \end{vmatrix} \times \begin{vmatrix} k1 \\ k2 \\ 0 \\ 1 \end{vmatrix}$$

Copyright (c) 1997 Mark Feldman (pcgpe@geocities.com)—All Rights Reserved

This article is part of *The Win95 Game Programmer's Encycloopedia*

Please retain this footer if you distribute this file

Appendix F—Matrices

This article is part of The Win95 Game Programmer's Encyclopedia

Matrices

Introduction

Matrices are extremely handy for writing fast 3D programs. They are just a 4×4 list of numbers, but they do have 2 very important properties:

1) They can be used to efficiently keep track of transformations, i.e., actions which occur in a VR program such as movement, rotation, zoom in/out etc.
2) A single matrix can represent an infinite number of these transformations in any combination. Let's say the user in your program walks forward, turns left, looks up, backs up a bit etc . . . All you need to do is keep a copy of a master matrix in memory and adjust it as the user does these things. At any point you then use this one matrix to figure out where everything in your virtual world should be drawn on the screen.

A transformation is simply a way of taking a set of points and modifying them in some way to get a new set of points. For example, if the user moves 10 units forward in a certain direction then the net result is the same as if all objects in the world moved 10 units in the opposite direction.

In 3D computer graphics it is often convenient to assume that the view-point is always at the origin <0,0,0>. Not only does it make it easier to render a scene but it often makes it a lot faster as well. Instead of having the user move around the world we can keep the user at the origin and make the objects move around instead. From the users point of view it will look exactly the same. Matrices are a fast and convenient tool to perform these transformations.

A Point in Space

As mentioned above, a point or vector can be represented in 3D space as<x,y,z>. When using matrix math it helps to represent it as<x,y,z,w>. That extra w there helps make things like movement easier to deal with. If we have a point in 3D space we can convert it to this new format by setting w to 1. In this text I'll be representing all points in space as a column vector:

$$\begin{vmatrix} x \\ y \\ z \\ w \end{vmatrix} <-w=1$$

Modifying the Position of a Point

Let's say we want to take any point <x,y,z,w> given and do something to it to get a new point. A row vector can be used to represent how we want to change a point:

These values contain the info on → $|A\ B\ C\ D| \cdot \begin{vmatrix} x \\ y \\ z \\ w \end{vmatrix}$ ← This is our point in 3D space how we want to change the point To figure out how the row vector $|A\ B\ C\ D|$ changes a point, we can visualize lying the point's column vector on it's side on top of it like this:

$$\begin{vmatrix} x & y & z & w \\ A & B & C & D \end{vmatrix} = (x*A)+(y*B)+(z*C)+(w*D)$$

Compare this to the article on basic 3D math (Appendix E) and you'll see that we are in fact taking the dot product of the two vectors. What we do above is multiply each top item by the item under it and add the results up to get the answer.

Let's say we want to be able to take any point <x,y,z,w> and figure out the coordinates for the point <x',y',z',1> which is exactly 4 units to the "right" of it, i.e., the point which is 4 units further along the x axis. We can do this by using 4 row vectors. The first one will calculate the new x point (x'), the next one the new y point (y') and so on. First let's look at calculating x'.

We know that the new x point can be calculated like this: x'=x+4, so a row vector to calculate this would be:

$|1\ 0\ 0\ 4|$ i.e. when we multiply this out by a point <x,y,z,w> we'll get:

$(x*1)+(y*0)+(z*0)+(w*4)=x+4$

We also know that y'=y, z'=z and w=1, so we can calculate the row vectors for each of the other values, and stack them all on top of each other:

| | | | | | | |
|---|---|---|---|---|---|---|
| x row vector → | |1 | 0 | 0 | 4| | $x' = 1*x+0*y+0*z+4 = x+4$ |
| y row vector → | |0 | 1 | 0 | 0| | $x' = 0*x+1*y+0*z+0 = y$ |
| z row vector → | |0 | 0 | 1 | 0| | $x' = 0*x+0*y+1*z+0 = z$ |
| 1 row vector → | |0 | 0 | 0 | 1| | $x' = 0*x+0*y+0*z+1 = 1$ |

And VOILA! That's what a matrix is! To take a point <x,y,z,w> and calculate the new point we just multiply the point by each of the row vectors.

Here's a more generic representation of what we are doing:

$$\begin{vmatrix} x' \\ y' \\ z' \\ w' \end{vmatrix} = \begin{vmatrix} M11 & M12 & M13 & M14 \\ M21 & M22 & M23 & M24 \\ M31 & M32 & M33 & M34 \\ M41 & M42 & M43 & M44 \end{vmatrix} \begin{vmatrix} x \\ y \\ z \\ w \end{vmatrix}$$

In this case <x,y,z,w> is the point we are popping in, <x',y',z',w'> is the point we'll be getting out, and each number in the matrix is represented by Mij, where i=row number and j=column number.

Following the line of reasoning above, we can figure out how to calculate the new point based on the given point and the matrix:

$x' = (x*M11)+(y*M12)+(z*M13)+M14$ $y' = (x*M21)+(y*M22)+(z*M23)+M24$ $z' = (x*M31)+(y*M32)+(z*M33)+M34$ $w' = (x*M41)+(y*M42)+(z*M43)+M44$

In practice, we don't really need that last equation, we know that it will always equal 1 so we don't have to calculate it.

Plugging a point into a matrix like this and getting a new point out is called "transforming" a point by a matrix, just keep that in mind so you know what to call your procedure to do it!

A few of the more commonly used matrices follow.

Doing Nothing

You often need a matrix to pop out exactly the same point as was plugged in. The matrix to do this is called the identity matrix:

$$\begin{vmatrix} 1 & 0 & 0 & 0 \\ 0 & 1 & 0 & 0 \\ 0 & 0 & 1 & 0 \\ 0 & 0 & 0 & 1 \end{vmatrix} \quad \begin{aligned} x' &= x \\ y' &= y \\ z' &= z \end{aligned}$$

Translation

A translation is simply adding (or subtracting) a point to any given point. Let's say you want to add TX to x, TY to y and TZ to z. The matrix to do this is:

$$\begin{vmatrix} 1 & 0 & 0 & tx \\ 0 & 1 & 0 & ty \\ 0 & 0 & 1 & tz \\ 0 & 0 & 0 & 1 \end{vmatrix} \quad \begin{aligned} x' &= x+tx \\ y' &= y+ty \\ z' &= z+tz \end{aligned}$$

Scaling

Sometimes we may need to scale a point, i.e., mutiply each axis by a given number. This is handy for things like zoom effects.

$$\begin{vmatrix} sx & 0 & 0 & 0 \\ 0 & sy & 0 & 0 \\ 0 & 0 & sz & 0 \\ 0 & 0 & 0 & 1 \end{vmatrix} \quad \begin{aligned} x' &= sx*x \\ y' &= sy*y \\ z' &= sz*tz \end{aligned}$$

Of course, if you only want to scale along the X axis (say) then you simply set SX to the scale value and set SY and SZ to 1.

Basic Rotations

We can rotate things around the x axis, the y axis, or the z axis. Each axis forms a line in 3D space. We can also rotate things around any arbitrary line. This is handy if we want to do effects like objects rotating about their own axis (which will be discussed later).

The matrix for rotating around the x axis by angle é is:

$$\begin{vmatrix} 1 & 0 & 0 & 0 \\ 0 & \cos é & -\sin é & 0 \\ 0 & \sin é & \cos é & 0 \\ 0 & 0 & 0 & 1 \end{vmatrix} \quad \begin{aligned} x' &= x \\ y' &= (\cos é)*y - (\sin é)*z \\ z' &= (\sin é)*y + (\cos é)*z \end{aligned}$$

The matrix for rotating around the y axis by angle é is:

$$\begin{vmatrix} \cos é & 0 & \sin é & 0 \\ 0 & 1 & 0 & 0 \\ -\sin é & 0 & \cos é & 0 \\ 0 & 0 & 0 & 1 \end{vmatrix} \quad \begin{aligned} x' &= (\cos é)*x + (\sin é)*z \\ y' &= y \\ z' &= -(\sin é)*x + (\cos é)*z \end{aligned}$$

And the matrix for rotating around the z axis by angle é is:

$$\begin{vmatrix} \cos é & -\sin é & 0 & 0 \\ \sin é & \cos é & 0 & 0 \\ 0 & 0 & 1 & 0 \\ 0 & 0 & 0 & 1 \end{vmatrix} \quad \begin{aligned} x' &= (\cos é)*x - (\sin é)*y \\ y' &= (\sin é)*x + (\cos é)*y \\ z' &= z \end{aligned}$$

Mirroring

Figure 15:
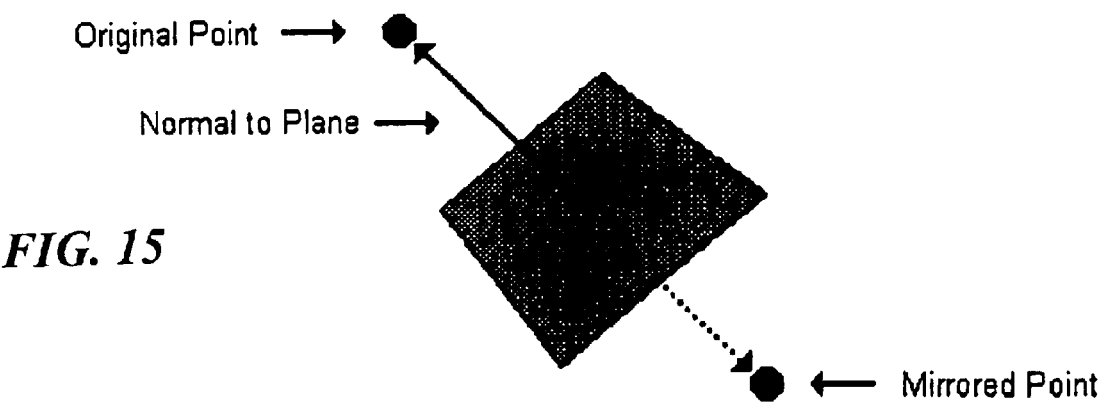
FIG. 15 illustrates mirroring wherein all points are flipped about an arbitrary plane in 3D space, used in matrix mathematics.

Mirroring involves flipping all points about an arbitrary plane in 3D space, as illustrated in FIG. 15. From the diagram in FIG. 15 we can easily see that to mirror a point we need to:

1) Calculate the distance of the point from the plane
2) Move the point in the opposite direction to the plane normal a distance of 2*dist.

The distance of a point from a plane can be calculated easily with the plane equation:

$$dist = p * \text{normal} + k$$

(Normally this equation assumes that the plane normal is a unit vector. In this particular case however this is not a requirement).

Based on the information above we can see that the final mirror equation is:

$$\begin{aligned} p' &= p - 2*dist*\text{normal} \\ &= p - 2*(p*\text{normal}+k)*\text{normal} \\ &= p - 2*(p.x*\text{normal}.x + p.y*\text{normal}.y + p.z*\text{normal}.z + k)*\text{normal} \end{aligned}$$

Expanding this out we get the equation for each element in p':

$$\begin{aligned} p' \cdot x &= p \cdot x - 2*p \cdot x*nx*nx + 2*p \cdot y*ny*nx + \\ & \quad 2*p \cdot z*nz*nx + 2*k*nx \\ p' \cdot y &= p \cdot y - 2*p \cdot x*nx*ny + 2*p \cdot y*ny*ny + \\ & \quad 2*p \cdot z*nz*ny + 2*k*ny \\ p' \cdot z &= p \cdot z - 2*p \cdot x*nx*nz + 2*p \cdot y*ny*nz + \\ & \quad 2*p \cdot z*nz*nz + 2*k*nz \end{aligned}$$

where <nx,ny,nz>=normal. Thus the final mirror matrix for any given plane p*<nx,ny,nz>+k=0 is:

$$\begin{vmatrix} 1-2*nx*nx & -2*nx*ny & -2*nx*nz & -2*nx*k \\ -2*ny*nx & 1-2*ny*ny & -2*ny*nz & -2*ny*k \\ -2*nz*nx & -2*nz*ny & 1-2*nz*nz & -2*nz*k \\ 0 & 0 & 0 & 1 \end{vmatrix}$$

(Note the common terms: $m[0][1] = m[1][0]$, $m[0][2] = m[2][0]$, and $m[1][2] = m[2][1]$).

Multiplying Matrices

So now that we know how to represent each of the different types of matrix operations, how do we combine them? By multiplying two matrices together:

$$P = B \times A$$

If transforming a point by A gives one effect, and transforming it by B gives another, then transforming it by P alone gives you the same result as if you had transformed it by A then by B. You can keep multiplying a matrix by as many other matrices as you like, and each time the end product will contain the info for all of them in the correct order.

To multiply B by A, you treat each column in A as a separate column vector, and transform it by matrix B to get the new column. Let's look at doing it for the first column in A:

$$\begin{vmatrix} P11 \\ P21 \\ P31 \\ P41 \end{vmatrix} = \begin{vmatrix} B11 & B12 & B13 & B14 \\ B21 & B22 & B23 & B24 \\ B31 & B32 & B33 & B34 \\ B41 & B42 & B43 & B44 \end{vmatrix} \begin{vmatrix} A11 \\ A21 \\ A31 \\ A41 \end{vmatrix}$$

So that first column of P will be:

$$\begin{vmatrix} (A11*B11)+(A21*B12)+(A31*B13)+(A41*B14) \\ (A11*B21)+(A21*B22)+(A31*B23)+(A41*B24) \\ (A11*B31)+(A21*B32)+(A31*B33)+(A41*B34) \\ (A11*B41)+(A21*B42)+(A31*B43)+(A41*B44) \end{vmatrix}$$

We need to split the A matrix up into it's 4 column vectors and transform each column vector by matrix B to get 4 new column vectors:

$$\begin{vmatrix} P11 \\ P21 \\ P31 \\ P41 \\ P12 \\ P22 \\ P32 \\ P42 \\ P13 \\ P23 \\ P33 \\ P43 \\ P14 \\ P24 \\ P34 \\ P44 \end{vmatrix} = \begin{vmatrix} B11 & B12 & B13 & B14 \\ B21 & B22 & B23 & B24 \\ B31 & B32 & B33 & B34 \\ B41 & B42 & B43 & B44 \\ B11 & B12 & B13 & B14 \\ B21 & B22 & B23 & B24 \\ B31 & B32 & B33 & B34 \\ B41 & B42 & B43 & B44 \\ B11 & B12 & B13 & B14 \\ B21 & B22 & B23 & B24 \\ B31 & B32 & B33 & B34 \\ B41 & B42 & B43 & B44 \\ B11 & B12 & B13 & B14 \\ B21 & B22 & B23 & B24 \\ B31 & B32 & B33 & B34 \\ B41 & B42 & B43 & B44 \end{vmatrix} \begin{vmatrix} A11 \\ A21 \\ A31 \\ A41 \\ A12 \\ A22 \\ A32 \\ A42 \\ A13 \\ A23 \\ A33 \\ A43 \\ A14 \\ A24 \\ A34 \\ A44 \end{vmatrix}$$

The resulting matrix is then made by combing these 4 column vectors back into a single matrix:

$$B \times A = \begin{vmatrix} P11 & P12 & P13 & P14 \\ P21 & P22 & P23 & P24 \\ P31 & P32 & P33 & P34 \\ P41 & P42 & P43 & P44 \end{vmatrix}$$

One thing to keep in mind is that the bottom row in any matrix will always be [0 0 0 1], so we can use this to slightly speed up matrix multiplication. Here's a general algorithm which will multiply 2 matrices:

```
Let A and B be our matrices, P will be the result (B x A).
var i,j : integer;
for i := 0 to 2 do
   for j := 0 to 3 do
      begin
         P[i][j] := 0;
         for k := 0 to 3 do
            P[i][j] := P[i][j] + B[i][k] * A[k][j];
      end;
P[3][0] := 0; { Set the bottom row to 0 0 0 1 }
P[3][1] := 0;
P[3][2] := 0;
P[3][3] := 1.
```

The Inverse Matrix

Let's say we have two matrices A and B. If the following is true:

$$A \times B = B \times A = \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$

then we say that B is the __inverse__ of A (and visa-versa). If you transform a point P1 by matrix A then you'll get a new point P2. If you then transform P2 by matrix B, it'll return P1. The two matrixes have the same effect but in "opposite" directions, e.g., if A moves all points 5 spaces to the "left" then B will move them 5 spaces to the "right". Similarly if A rotates space around a particular axis one way then B will rotate by the same amount around the same axis in the opposite direction.

There are several methods for calculating the inverse of a matrix, for large matrices the Gaussian method is preferred. Gaussian uses a technique called of "row reduction", first we create a large matrix like so:

This is the matrix
we are trying to            This is the identity
find the inverse of              matrix $$\begin{vmatrix} A11 & A12 & A13 & A14 \\ A21 & A22 & A23 & A24 \\ A31 & A32 & A33 & A34 \\ A41 & A42 & A43 & A44 \end{vmatrix} \quad \begin{matrix} 1 & 0 & 0 & 0 \\ 0 & 1 & 0 & 0 \\ 0 & 0 & 1 & 0 \\ 0 & 0 & 0 & 1 \end{matrix}$$

Our goal is to perform various "elementary row operations" on this matrix to put it in the following form:

Identity matrix          The inverse $$\begin{vmatrix} 1 & 0 & 0 & 0 \\ 0 & 1 & 0 & 0 \\ 0 & 0 & 1 & 0 \\ 0 & 0 & 0 & 1 \end{vmatrix} \quad \begin{matrix} B11 & B12 & B13 & B14 \\ B21 & B22 & B23 & B24 \\ B31 & B32 & B33 & B34 \\ B41 & B42 & B43 & B44 \end{matrix}$$

In the above matrices A is our initial matrix and B will be the inverse of A.

There are three kinds of elementary row operations we can use:

RULE 1—Interchange two rows.
RULE 2 Multiply any row by a constant other than 0.
RULE 3—Add a constant multiple of any row to another row.

Here is the basic algorithm to figure out which steps to perform as well as their order (this algorithm assumes that the bottom row of a matrix is always [0 0 0 1]):

```
var i,j,row : integer;
multiple, divisor : real;
   A : array[0..3][0..7] of real;
Set values A[0..3][0..3] to our 4 x 4 matrix
Set values A[0..3][4..7] to the 4 x 4 identity matrix
{ Loop through each row }
for row := 0 to 3 do
   begin
      { Make sure this row doesn't have a 0 in A[row][row] (use
      RULE 1) }
      if A[row][row] = 0 then
         begin
            find a row i where (i>row) and (i<3) and (A[i][row] <> 0)
            interchange rows 'i' and 'row'
         end;
      { Divide this row by a constant so that A[row][row] = 1 (use RULE
2) }
      divisor := A[row][row];
      for j := 0 to 7 do
         A[row][j] := A[row][j] / divisor;
      { Make all other elements in column 'row' a 0 (use RULE 3) }
      for i := 0 to 2 do
         if i <> row then
            begin
               multiple := A[i][row];
               for j := 0 to 7 do
                  A[i][j] := A[i][j] - multiple * A[row][j];
            end;
   end;
Return the matrix in the values A[0..3][4..7]
```

There are cases where a matrix doesn't have an inverse. If this happens then the first part of the algorithm above will fail, you won't be able to find a row where A[i][row]!=0. However, if you stick to the "normal" 3D operations discussed in this article (translation, rotation, scaling etc) then the matrices produced will always have an inverse.

One other very important thing to remember is that due to round-off errors you will often get values in the matrix such as 0.000001 which are supposed to be 0. When looking for a row where A[i][row]!=0 you must keep this in mind, and instead check that the absolute value is larger than some small number (e.g., 0.0001).

Rotating Around an Arbitrary Axis

Let's say we need to rotate space by about an arbitrary axis defined by the line o+kd (where o is the origin point <ox,oy,oz> and d is the directional vector <dx,dy,dz>). Here are the steps needed to perform this rotation:

1) First translate all of space so that the line of rotation starts at the origin. Do this by subtracting the line's origin point from all points. Here is the matrix needed, along with it's inverse:

$$F = \begin{vmatrix} 1 & 0 & 0 & -ox \\ 0 & 1 & 0 & -oy \\ 0 & 0 & 1 & -oz \\ 0 & 0 & 0 & 1 \end{vmatrix} \quad F' = \begin{vmatrix} 1 & 0 & 0 & ox \\ 0 & 1 & 0 & oy \\ 0 & 0 & 1 & oz \\ 0 & 0 & 0 & 1 \end{vmatrix}$$

2) Next rotate space around the z axis until the line of rotation lies in the x/z plane:

$$G = \begin{vmatrix} dx/v & dy/v & 0 & 0 \\ -dy/v & dx/v & 0 & 0 \\ 0 & 0 & 1 & 0 \\ 0 & 0 & 0 & 1 \end{vmatrix} \quad G' = \begin{vmatrix} dx/v & -dy/v & 0 & 0 \\ dy/v & dx/v & 0 & 0 \\ 0 & 0 & 1 & 0 \\ 0 & 0 & 0 & 1 \end{vmatrix}$$

where v=SQRT(dx*dx+dy*dy). You will now have a new line of rotation with one end at the origin and the other end at the point <v,0,dz>.

3) Now rotate space around the y axis until the line of rotation lies along the z axis:

$$H = \begin{vmatrix} dz/w & 0 & -v/w & 0 \\ 0 & 1 & 0 & 0 \\ v/w & 0 & dz/w & 0 \\ 0 & 0 & 0 & 1 \end{vmatrix} \quad H' = \begin{vmatrix} dz/w & 0 & v/w & 0 \\ 0 & 1 & 0 & 0 \\ -v/w & 0 & dz/w & 0 \\ 0 & 0 & 0 & 1 \end{vmatrix}$$

where w=SQRT(v*v+dz*dz)=SQRT(dx*dx+dy*dy+dz*dz).

4) At this point the axis of rotation is a line lying along the z axis between the points <0,0,0> and <0,0,w>, so you can rotate space around the z axis by:

$$W = \begin{vmatrix} \cos A & -\sin A & 0 & 0 \\ \sin A & \cos A & 0 & 0 \\ 0 & 0 & 1 & 0 \\ 0 & 0 & 0 & 1 \end{vmatrix}$$

5) So to do the entire rotation you must first transform space by F,G and H to align the axis of rotation along the z axis, then you do the actual rotation around the z axis using matrix W, then you transform space by H', G' and F' to put everything back into place. By multiplying these matrices together you can create a single matrix to do the entire rotation:

$$P = F' \times G' \times H' \times W \times H \times G \times F$$

Any points transformed by this matrix will be rotated about the line by an angle of A.

If the term 1/v in the G and G' matrices result in a singularity, it can be fixed by replacing G and G' with the identity matrix when v is 0.

Solving Simultaneous Equations

Imagine that we have the following equations:

$$a*x + b*y + c*z + d = 0$$

$$e*x + f*y + g*z + h = 0$$

$$i*x + j*y + k*z + l = 0$$

Now imagine that we need to find a point <x,y,z> which satisfies all 4 equations. These equations contain 12 unknowns, so it's clear that it would be very difficult to solve using "regular" algebra.

Matrices on the other hand provide us with a very useful tool for solving such problems. We can create a matrix like this:

$$\begin{vmatrix} 0 \\ 0 \\ 0 \\ 1 \end{vmatrix} = \begin{vmatrix} a & b & c & d \\ e & f & g & h \\ i & j & k & l \\ 0 & 0 & 0 & 1 \end{vmatrix} \begin{vmatrix} x \\ y \\ z \\ 1 \end{vmatrix}$$

When we expand this out (as I showed earlier on in this article) we get the 4 equations we are trying to solve. We also know that we can use the inverse matrix to rearrange the equation:

$$\begin{vmatrix} x \\ y \\ z \\ 1 \end{vmatrix} = \begin{vmatrix} a & b & c & d \\ e & f & g & h \\ i & j & k & l \\ 0 & 0 & 0 & 1 \end{vmatrix}^{-1} \begin{vmatrix} 0 \\ 0 \\ 0 \\ 1 \end{vmatrix}$$

These equations will expand out to the following:

$$x = A*0 + B*0 + C*0 + D*1 = D$$

$$y = E*0 + F*0 + G*0 + H*1 = H$$

$$z = I*0 + J*0 + K*0 + L*1 = L$$

(The letters have been capitalized since the inverse matrix will typically contain different values than the original).

In summary, if we create a matrix from 3 parametric equations and then calculate the inverse of that matrix then the 4th column will contain a point which satisfies all 3 equations. If the inverse matrix operation fails then we know that the problem has no solution (or an infinite number of solutions).

Incidentally the fact that we'll only wind up using the 4th column can help in optimizing this procedure since we don't need to calculate the entire matrix.

2D Matrices

In this text I've been using 4×4 matrices for 3D coordinate geometry, but it's just as easy to use a smaller matrix for 2D (or higher), we simply drop the z term.

2D matrices are of the form:

$$\begin{vmatrix} x' \\ y' \\ 1 \end{vmatrix} = \begin{vmatrix} M11 & M12 & M13 \\ M21 & M22 & M23 \\ 0 & 0 & 1 \end{vmatrix} \begin{vmatrix} x \\ y \\ 1 \end{vmatrix}$$

i.e., $x' = M11*x + M12*y + M13$ $y' = M21*x + M22*y + M23$

The 2identify matrix is:

$$\begin{vmatrix} 1 & 0 & 0 \\ 0 & 1 & 0 \\ 0 & 0 & 1 \end{vmatrix} \quad \begin{aligned} x' &= x \\ y' &= y \end{aligned}$$

To translate by <tx, ty>:

$$\begin{vmatrix} 1 & 0 & tx \\ 0 & 1 & ty \\ 0 & 0 & 1 \end{vmatrix} \qquad \begin{aligned} x' &= x + tx \\ y' &= y + ty \end{aligned}$$

To scale by <sx, sy>:

$$\begin{vmatrix} sx & 0 & 0 \\ 0 & sy & 0 \\ 0 & 0 & 1 \end{vmatrix} \begin{aligned} x' &= x * sx \\ y' &= y * sy \end{aligned}$$

And to rotate about the origin by A radians:

$$\begin{vmatrix} \cos(A) & -\sin(A) & 0 \\ \sin(A) & \cos(A) & 0 \\ 0 & 0 & 1 \end{vmatrix} \begin{aligned} x' &= \cos(A)*x - \sin(A)*y \\ y' &= \sin(A)*x + \cos(A)*y \end{aligned}$$

Copyright (c) 1997 Mark Feldman (pcgpe@geocities.com)—All Rights Reserved

This article is part of *The Win95 Game Programmer's Encyclooedia*

Please retain this footer if you distribute this file.

Although the present invention and its advantages have been described in detail, it should be understood that various changes, substitutions and alterations can be made herein without departing from the spirit and scope of the invention. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the invention is intended to include within its scope such processes, machines, manufacture, compositions of matter, means, methods, or steps.

What is claimed is:

1. In a digitized tomosynthesis method for projecting a 3D volumetric image of an object onto a virtual projection plane, the image being defined by object voxels, in which a ray of energy from a source travels through the object to impinge on an energy sensing image plate having an active area defining an image plane and in which an image is acquired by the energy sensor at successive relative rotational positions of the object and source, wherein a Z axis is defined as the axis of relative rotation of the object, an X axis is defined as relatively horizontal at right angles to the Z axis, a Y axis is defined as relatively vertical at right angles to the X and Z axes, rotation about the X axis is defined as pitch, rotation about the Y axis is defined as yaw, and rotation about the Z axis is defined as roll, and wherein the image plate is parallel with the XZ plane and the source is positioned above the XZ plane with its optical axis defining the center of a radiation cone and intersecting the image plate at approximately its central pixel, the improvement according to which a 3D volumetric image of the object is projected by steps comprising:

computing the coordinate of an object voxel referenced to the image plane;

computing the image plane intercept of the ray of energy from the source through the object voxel; and projecting a reconstructed 3D volumetric image of the object onto the virtual projection plane.

2. The method of claim 1 in which the coordinate of the object voxel referenced to the image plane is computed by:

defining an object bounding box above the XZ plane that intercepts the radiation cone so that a shadow of the object falls on the active area of the image plate, the position and orientation of the bounding box having a reference point coordinate defined by X, Y, Z, pitch, yaw, and roll;

specifying the coordinate of the voxel referenced to the object bounding box;

rotating the voxel coordinate by the pitch, yaw, and roll of the bounding box; and translating the voxel coordinate to the reference point coordinate.

3. The method of claim 2 in which the bounding box has a size and height whereby it includes the volume of interest of the object.

4. The method of claim 2 in which the bounding box and image plate are each rectangular and in which the sides of the bounding box are parallel with the sides of the image plate.

5. The method of claim 1 in which the virtual projection plane comprises an alpha blend plane subdivided into an array of pixel cells, wherein the ray of energy defines a trace thereof representing a virtual sight path ray passing from a view point through one pixel cell of the alpha blend plane to define a view level image.

6. The method of claim 5 in which the array of pixel cells is a rectangular array.

7. The method of claim 5 in which there is a ray trace for each pixel cell of the alpha blend plane for each view level image.

8. The method of claim 5 comprising forming a projected planar view of a selected view level image plane at the alpha blend plane by transferring the image pixel cell value at the intersect of the ray trace and the selected view level plane to the image pixel cell at the intersect of the ray trace and the alpha blend plane.

9. The method of claim 1 in which the steps thereof are performed mathematically and programmed whereby the reconstructed 3D volumetric image is projected by execution of the program on a computer.

10. The method of claim 1 in which a plurality of view level images are formed successively at one image plane.

11. The method of claim 10 wherein the view point and alpha blend plane are translated a level closer to said one image plane for each successive view level.

12. The method of claim 1 in which the 3D volumetric image is stored in a computer memory as an array of pixels represented by a value.

13. The method of claim 12 in which the brightness of each pixel is proportional to the value.

14. The method of claim 1 in which the ray of energy is x-ray radiation.

15. The method of claim 1 in which the energy sensor is a flat panel digital detector.

16. In a digitized tomosynthesis method for projecting a 3D volumetric image of an object onto a virtual projection plane, the image being defined by object voxels, in which a ray of energy from a source travels through the object to impinge on a rectangular energy sensing image plate having an active area defining an image plane and in which an image is acquired by the energy sensor at successive relative rotational positions of the object and source, wherein a Z axis is defined as the axis of relative rotation of the object, an X axis is defined as relatively horizontal at right angles to the Z axis, a Y axis is defined as relatively vertical at right angles to the X and Z axes, rotation about the X axis is defined as pitch, rotation about the Y axis is defined as yaw, and rotation about the Z axis is defined as roll, and wherein the image plate is parallel with the XZ plane and the source is positioned above the XZ plane with its optical axis defining the center of a radiation cone and intersecting the image plate at approximately its central pixel, the improvement according to which the virtual projection plane comprises an alpha blend plane subdivided into a rectangular array of pixel cells, wherein the ray of energy defines a trace thereof representing a virtual sight path ray passing from a view point through one pixel cell of the alpha blend plane to define a view level image, there being a ray trace for each pixel cell for each view level image, and in which a 3D volumetric image of the object is projected by steps comprising:

computing the coordinate of an object voxel referenced to the image plane by: (a)

defining a rectangular object bounding box above the XZ plane, the bounding box having sides that are parallel with the sides of the image plate and having a size and height that includes the volume of interest of the object, whereby the bounding box intercepts the radiation cone so that a shadow of the object falls on the active area of the image plate, the position and orientation of the bounding box having a reference point coordinate defined by X, Y, Z, pitch, yaw, and roll, (b) specifying the coordinate of the voxel referenced to the object bounding box, (c) rotating the voxel coordinate by the pitch, yaw, and roll of the bounding box, and (d) translating the voxel coordinate to the reference point coordinate;

computing the image plane intercept of the ray of energy from the source through the object voxel; and forming a plurality of successively selected view level image planes at the alpha blend plane by transferring the image pixel cell values at the intersects of the ray trace and the selected view level planes to the image pixel cells at the intersects of the ray trace and the alpha blend plane, the view point and alpha blend plane being translated a level closer to said one image plane for each successive view level, whereby to project a reconstructed 3D volumetric image of the object onto the virtual projection plane.

17. The method of claim 16 in which the steps thereof are performed mathematically and programmed whereby the reconstructed 3D volumetric image is projected by execution of the program on a computer.

18. The method of claim 16 in which the 3D volumetric image is stored in a computer memory as an array of pixels represented by a value in which the brightness of each pixel is proportional to the value.

19. The method of claim 16 in which the ray of energy is x-ray radiation.

20. The method of claim 16 in which the energy sensor is a flat panel digital detector.

* * * * *